United States Patent
Lin et al.

(10) Patent No.: US 9,059,873 B2
(45) Date of Patent: *Jun. 16, 2015

(54) ADAPTIVE MODULATION FOR COOPERATIVE CODED SYSTEMS

(71) Applicant: KONINKLIJKE PHILIPS ELECTRONICS N.V., Eindhoven (NL)

(72) Inventors: Zinan Lin, Brooklyn, NY (US);
Monisha Ghosh, Chappaqua, NY (US);
Elza Erkip, New York, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,653

(22) Filed: Apr. 17, 2013

(65) Prior Publication Data

US 2013/0235793 A1    Sep. 12, 2013

Related U.S. Application Data

(63) Continuation of application No. 11/993,632, filed as application No. PCT/IB2006/052141 on Jun. 27, 2006, now Pat. No. 8,451,768.

(60) Provisional application No. 60/644,218, filed on Jan. 14, 2005, provisional application No. 60/694,544, filed on Jun. 28, 2005.

(51) Int. Cl.
*H04B 7/14*    (2006.01)
*H04L 27/00*    (2006.01)
(Continued)

(52) U.S. Cl.
CPC ........ *H04L 27/0008* (2013.01); *H04B 7/15592* (2013.01); *H04L 1/0003* (2013.01); *H04L 1/18* (2013.01); *H04L 2001/0097* (2013.01); *Y02B 60/31* (2013.01)

(58) Field of Classification Search
None
See application file for complete search history.

(56) References Cited

U.S. PATENT DOCUMENTS 8,451,768 B2 *  5/2013  Lin et al. .................. 370/315
8,620,230 B2 * 12/2013  Sanderovitz et al. ......... 455/101
(Continued)

FOREIGN PATENT DOCUMENTS

WO    03026189 A1    3/2003

OTHER PUBLICATIONS

Hasna, "On the Capacity of Cooperative Diversity Systems With Adaptive Modulation", Wireless and Optical Communications Networks, Second IFIP Internationa Conference on Dubai, United Arab Emirates UAE, March 6-8, 2005, Piscataway, NJ, USA, IEEE, p. 432-436, XP010801927.

(Continued)

*Primary Examiner* — Duc C Ho

(57) ABSTRACT

A system, method, and apparatus are provided for a source to choose a partner/relay from at least one candidate to transmit at least part of a message from the source to destination. The choice depends on the channel conditions of the source and when the source is experiencing poor channel quality to the destination, the source selects the candidate and the modulation modes of the source and partner/relay such that the frame error rate (FER) of the source is lowered. Otherwise, a modulation mode is selected for each of the source and the partner/relay that most improves the gain in throughput of the source. The present invention applies to modes consisting of binary phase shift keying (BPSK), quadrature phase shift keying (QPSK), and 16-state quadrature amplitude modulation (16-QAM).

22 Claims, 17 Drawing Sheets

(51) Int. Cl.
*H04B 7/155* (2006.01)
*H04L 1/00* (2006.01)
*H04L 1/18* (2006.01)

(56) References Cited

U.S. PATENT DOCUMENTS

| | | | |
|---|---|---|---|
| 2004/0001462 A1 | 1/2004 | Yavuz et al. | |
| 2006/0020700 A1 | 1/2006 | Qiu et al. | |
| 2008/0137585 A1* | 6/2008 | Loyola et al. | 370/315 |

OTHER PUBLICATIONS

Lin et al, "Adaptive Modulation for Coded Cooperative Systems", Signal Processing Advance in Wireless Communications, 6th Workshop on New York, NY, USA, Jun. 2-8, 2005, p. 615-619, XP010834533.

Laneman, "Cooperative Diversity in Wireless Newtorks: Algorithms and Architectures", Massachusetts Institute of Technology, Sep. 2002, p. 1-187.

Sendonaris et al, "User Cooperative Diversity"—Part 11: Implementation Aspects and Performance Analysis, Presented in Part at ISIT '98, pp. 1-33.

Hunter et al, "Coded Cooperation Under Slow Fading, Fast Fading, and Power Control", Multimedia Communications Laboratory, National Science Foundation, p. 1-5.

Stefanov et al, "Cooperative Coding in Wireless Communications", Multimedia Communications Laboratory, University of Texas at Dallas, Vol. 10, Feb. 15, 2005, pp. 1470-1476.

Stefanov et al, "Cooperative Space—Time Coding for Wireless Networks", Polythechnic University, ITW, Paris, France, Mar. 31-Apr. 4, 2003, pp. 1-4.

Xia, Multi-Antenna Adaptive Modulation and Transmit Beamforming Based on Bandwith-Constrained Feedback, IEEE 2003, pp. 187-191.

Holland et al, "A Rate-Adaptive MAC Protocol for Multi-Hop Wireless Networks", ACM/IEEE, Annual International Conf. on Mobile Computing and Networking, Rome, Italy, Jul. 2001, pp. 236-251.

Lin et al, An Asymptotic Analysis on the Performance of Coded Cooperation Systems, Proc. IEEE Vehicular Technology Conf., Los Angels, CA, 2004.

Sendonaris et al, "User Cooperation Diversity", Part 1, System Description, IEEE Trans. Commun. vol. 51, No. 11, Nov. 2003, pp. 1938-1927.

Written Opinion of the International Searching Authority for International Application, No. PCT/IB2006/052141.

* cited by examiner

DIRECT TRANSMISSION

ORTHOGONAL COOPERATIVE DIVERSITY TRANSMISSION

ADAPTIVE MODULATION FOR COOPERATIVE CODED SYSTEMS

This application is a continuation of U.S. Pat. No. 8,451,768, which is a National Stage of International Application PCT/IB2006/052141 filed 2006 Jun. 27 which claimed priority of U.S. Provisional Applications Ser. No. 60/694,544 filed 2005 Jun. 28 and Ser. No. 60/644,218 filed 2005 Jan. 14 which are all incorporated herein in whole by reference.

The present invention relates to a system and method for a coded cooperative wireless communication system in which users can adapt their modulation mode based on their channel qualities to maximize data throughput.

The destructive addition of time-varying multipaths and interference from other users causes severe attenuation of a transmitted signal at a receiver side. Diversity techniques provide the receiver several independent (at least uncorrelated) replicas of the same information signal such that the probability is considerably reduced that all the signal components are simultaneously faded. In a wireless network, collaboration among mobile stations at the physical layer has been shown to be an efficient way to introduce diversity. Such a wireless system has independent nodes that communicate with a common destination, such as an access point (AP) in a Wireless LAN system and a base station in a cellular system. For low mobility nodes, it is difficult to exploit temporal diversity through interleaving. Also, spatial diversity through multiple antennas placed on a single device may be limited due to size constraints of the node. Cooperative wireless communication enables nodes to use each other's antenna to obtain an effective form of spatial diversity. A partnering node processes signals overheard from an original source and then transmit them to a destination, such as an AP. The destination, e.g., AP, combines signals received from the original node and the partner, thus creating an efficient form of spatial diversity.

Conventionally, partners are chosen in advance and analyses have shown that cooperation provides full diversity while improving overall performance in terms of outage probability or frame error rate (FER), see, e.g., A. Sendonaris, et al, "User Cooperation Diversity-Part I: System Description,", IEEE Trans. Commun. Vol. 51, No. 11, pp. 1927-1938, November 2003, and "User Cooperation Diversity-Part II: Implementation Aspects and Performance Analysis," IEEE Trans. Commun. Vol. 51, No. 11, pp. 1939-1948, November 2003, the entire contents of which are hereby incorporated by reference. Further in Lin et al., the condition is derived under which cooperation improves the original user's FER performance when a coded cooperative algorithm of Stefanov et al. is used, see Z. Lin et al., "An Asymptotic Analysis On the Performance of Coded Cooperation Systems," Proc. IEEE Vehicular Technology Conference, Los Angeles, Fall 2004 and A. Stefanov et al., "Cooperative Coding For Wireless Networks," IEEE Trans. Commun., vol. 52, no. 9, pp. 1470-1476, September 2004, the entire contents of which are hereby incorporated by reference. Further, the cited references show that high channel quality of a partner guarantees that a user gets benefits from cooperative coding. However, in all the above cited works as well as current research, partnering users are assumed to be using a fixed and common modulation mode.

In wireless services, higher data rate is one of the main design considerations. Further, in some wireless systems, e.g., IEEE 802.11, nodes are able to transmit their data at multiple rates and are allowed to adapt their data rates to match their channel conditions such that the throughput for their given channel conditions is maximized, see, respectively, IEEE 802.11, "Wireless LAN MAC and PHY Specifications, Standard, August 1999 and G. Holland, et al. "A Rate-Adaptive MAC Protocol for Multi-Hop Wireless Networks," Proc of the 7$^{th}$ Annual International Conference on Mobile Computing and Networking, pp 236-251, Rome, Italy, 2001, the entire contents of both of which are hereby incorporated by reference.

Thus, a way for cooperating partners to adjust their data rates to their prevailing channel conditions is needed such that an original user's (source's) data throughput is maximized. The present invention provides an apparatus and method for cooperating partners of coded cooperative systems to select their modulation modes based on their channel qualities to an access point (AP) in order to optimize the data throughput of the original user to the AP.

In the present invention not only a partner's channel quality but also the source's channel quality is taken into consideration in the selection of the partner's modulation rate. Further, in the present invention the source also takes into consideration its partner's channel quality as well when selecting the source's modulation rate.

The present invention defines a system and method for cooperating partners of a coded cooperative system to determine
1. for a pair of cooperating users, the best modulation rate pair used by the pair of cooperating users in different signal-to-noise ratio regimes such that the throughput gain due to cooperation is maximized; and
2. for multiple candidate partners, how to choose a partner such that the throughput gain for the source is maximized.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
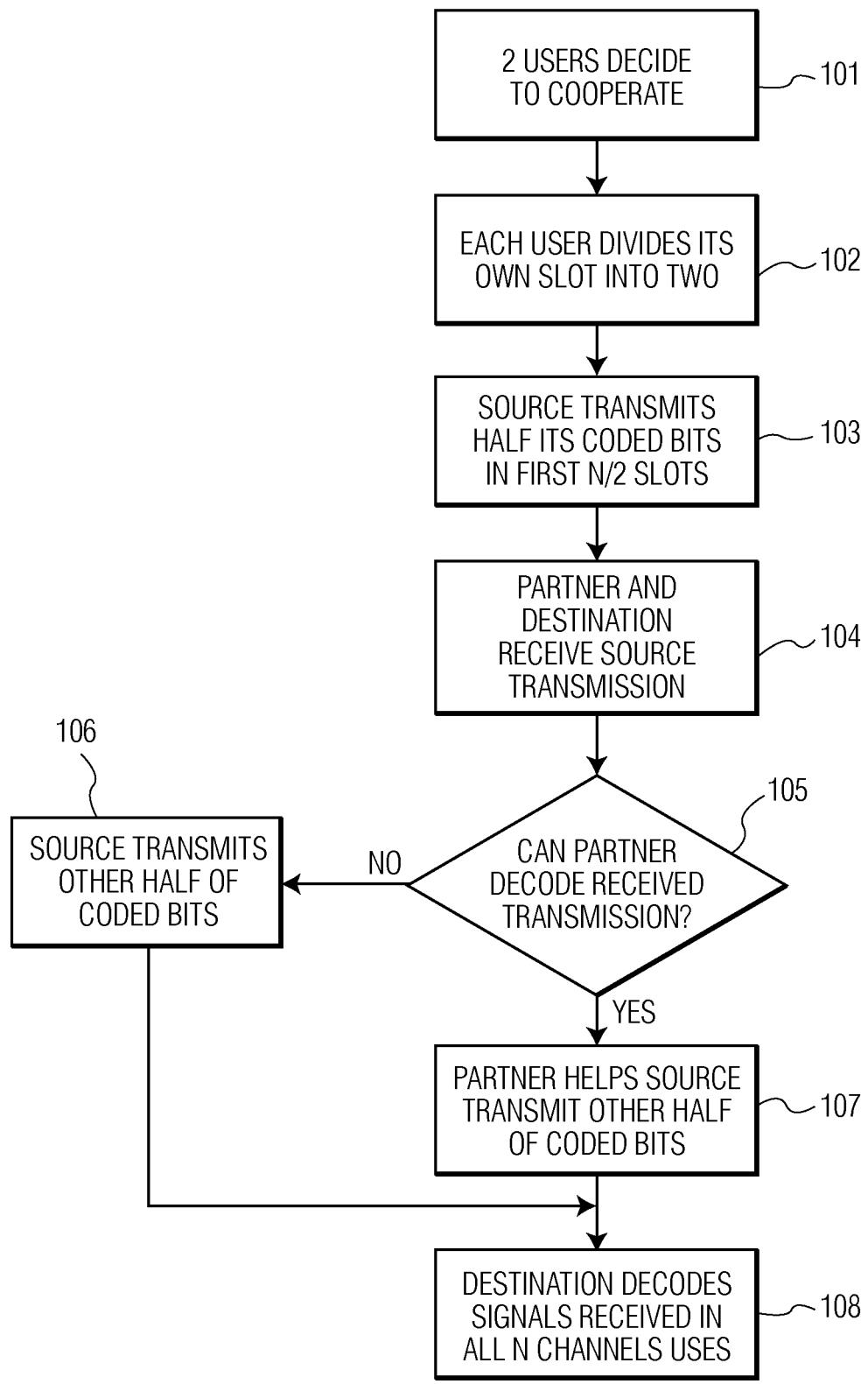
FIG. 1 is a flowchart of cooperating partners.
Figure 2A:
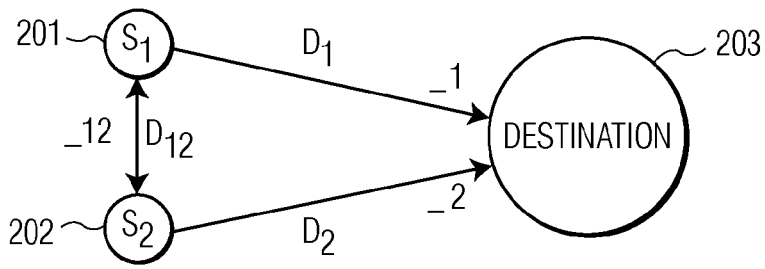
FIG. 2A illustrates user-cooperation for two sources and one common destination.
Figure 2B:
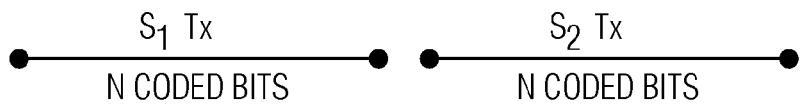
FIG. 2B illustrates time-division channel allocation using orthogonal direct transmission.
Figure 2C:
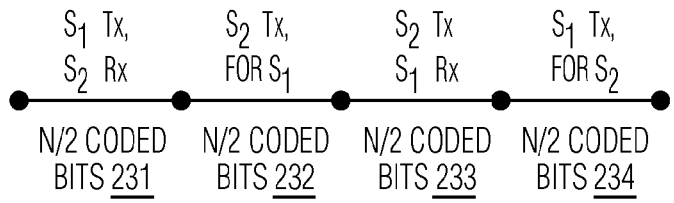
FIG. 2C illustrates time-division channel allocation using orthogonal cooperative diversity transmission.
Figure 2D:
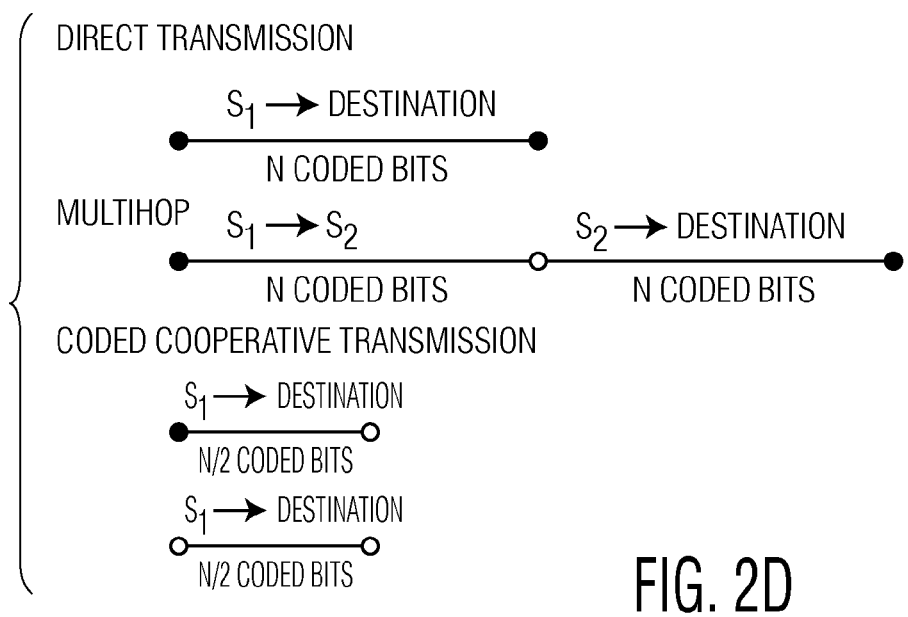
FIG. 2D illustrates three transmission schemes: direct, multi-hop and cooperative.

Without loss of generality, assume there are two nodes ($S_1$ and $S_2$) communicating with the same destination, e.g., AP, as in FIG. 2A. Let $\gamma_1$ and $\gamma_2$ denote the average received SNR at the destination 203 from $S_1$ 201 and $S_2$ 202, respectively. Assume that the channel between partnering users $S_1$ 201 and $S_2$ 202 is symmetric. Denote the average received SNR for the inter-user channel by $\gamma_{in}$. Assume cooperation is via time division multiplexing as illustrated in FIG. 2B and assume an underlying convolutional code. Further, assume non-cooperating users have separate time slots consisting of N coded symbols and that when they decide to cooperate at step 101 each user divides its own slot in two, as illustrated at step 101 in the flow chart of FIG. 1. As illustrated at 231 of FIG. 2C, in the first N/2 channel uses 231, the source transmits half of its coded bits, as indicated at step 103 of FIG. 1. This transmission is received by both the partner and the destination at step 104. The partner attempts to decode the information bits of the source at step 105. An error detection mechanism such as cyclic Redundancy Check (CRC) indicates whether the decoded copy at the partner is identical to the original. If decoding is successful, the partner re-encodes the information bits using different parity bits and transmits them in the second N/2 channel uses 232, as indicated at step 107. If decoding is not successful, the source continues the transmission by itself at step 106. The destination combines signals received in all N channel uses and decodes the combined signal. In the next frame, the roles 233 234 of the source and partner are reversed. Since multi-hop mitigates the path loss effect, multi-hop embodiments are provided in the system and method of the present invention. It is assumed that the transmitted energy per symbol is fixed as $\epsilon$ and that $S_1$ is the source node and $S_2$ acts as a pure relay. The packet is first transmitted from $S_1$ to $S_2$. Upon successful reception, the relay $S_2$ forwards the packet to the destination. In multi-hop, all the packets are transmitted through two hops. Therefore, for fair comparison, assume that $S_1$ and $S_2$ use half transmit energy individually, that is $\epsilon/2$, in multi-hop. In direct transmission (non-cooperative case) and coded cooperation, each packet takes one time slot to transmit. Therefore, in direct transmission, $S_i$ (i=1, 2) still uses $\epsilon$ to transmit the whole packet m and in coded cooperation, $S_i$ uses $\epsilon$ to transmit half of the whole packet cooperatively. These three schemes are illustrated in FIG. 2D.

Assume that the noise is additive white Gaussian with zero mean and power spectral density $$\frac{N_0}{2}.$$

For simplicity, ignore the processing power at the partner. Consider a complex Gaussian, flat fading channel with zero mean and unit variance. For a low mobility environment, assume that during the course of transmission or for each time slot, each user observes only one fading level towards the destination. Due to the spatial separation between users, these fades are independent. Hence, the user-to-destination channel is quasi-static and the cooperative transmission results in a block fading environment. The inter-user channel is also assumed to be quasi-static and independent of user-to-destination links. This cooperative scheme and channel model is described in A. Stefanov et al., "Cooperative coding for Wireless Networks," *IEEE Transactions on Communications*, vol. 52, no. 9, pp. 1470-1476, September 2004., the entire contents of which are hereby incorporated by reference.

For adaptive modulation used in multi-hop and cooperative systems and methods according to the present invention, assume that both partnering nodes can select their own modulation modes from candidates based on the averaged received SNRs in the destination, e.g., AP. The candidates include, but are not limited to, binary phase shift keying (BPSK), quadrature phase shift keying (QPSK), and 16 state quadrature amplitude modulation (16-QAM). Let $M_1$ and $M_2$ denote the number of bits per symbol sent by $S_1$ 201 and $S_2$ 202, respectively, when the cooperation protocol according to the present invention is performed and $N_1$ and $N_2$ be the number of bits per symbol transmitted by $S_1$ 201 and $S_2$ 202, respectively, when communication directly with the destination 203. Let $K_1$ and $K_2$ denote the number of bits per symbol sent by $S_1$ and $S_2$ respectively in multi-hop. Hence, for BPSK, QPSK, 16-QAM, $M_1, M_2, N_1, N_2, K_1, K_2 \in \{1, 2, 4\}$. Without loss of generality assume $N_1 = N_2$.

There are three ways to employ the adaptive modulation scheme of the present invention in a coded cooperative system:
1. the partner changes its modulation mode but the source keeps its own rate constant, that is $M_1 = N_1$;
2. the source adapts its modulation rate and the partner fixes its modulation mode, that is $M_2 = N_2$; and
3. both the source and the partner change their modulation rates simultaneously.

Only the corresponding throughput performance of each of the first two cases is analyzed below. The third case is readily obtained by extension from the results for the first two.

In the following sections, first, the throughput performance of a direct transmission, multi-hop and coded cooperative system are analyzed, then throughput gain due to cooperation is defined and finally conditions under which cooperation results in throughput gain for the source are derived. Assume:
  the destination, e.g., AP, uses CRCs to detect all errors in each packet and the probability of an undetected transmission error is negligible;
  there is no error in the transmission of acknowledgments from the receiver to the transmitter and this transmission is instantaneous;

the symbol transmission rate for each user is fixed as $R_s$ and each user uses the same convolutional code with rate R;

each data packet contains B data bits, and overhead bits are ignored so that the length of each frame/packet is equal to N bits, where N=B/R.; and the throughput is defined as the number of payload bits per second received correctly.

Direct transmission: The FER for non-cooperative (direct) case is $P_{f,i}^{no-coop} = \hat{P}_{f,i}^{QS}$. In this case, the throughput of the coded non-cooperative (direct transmission) system for the data of user i is written as:

$$\Gamma_{no-coop,i} = \frac{B(1 - P_{f,i}^{no-coop})}{\frac{B}{N_i R_S R}} = N_i R_S R(1 - P_{f,i}^{no-coop}) = N_i R_S R\left(1 - \hat{P}_{f,i}^{QS}\right) \quad (1)$$

Note that $\hat{P}_{f,i}^{QS}$ is a function of $N_1$ and $\gamma_1$. For higher order modulation, $\hat{P}_{f,i}^{QS}$ increases, but so does the multiplicative factor in $\Gamma_{no-coop,i}$. Hence, there exists an optimal modulation scheme $N_1$ which depends on the average received SNR, $\gamma_1$ from $S_1$ to the destination.

Multi-hop: $S_1$ re-transmits the coded packet to $S_2$ until the packet is to successfully received by $S_2$. Then $S_2$ relays the packet to the destination. If there is an error in the received packet at the destination, $S_2$ re-transmits. We let $P^{QS}_{m,in}$ and $P^{Qs}_{m,2}$ denote the FER of the channel code for the quasi-static channel from $S_1$-to-$S_2$ and from $S_2$-to-destination in multi-hop respectively. For the multi-hop scheme, it takes an average $$\frac{1}{\left(1 - P_{m,in}^{QS}\right)}$$

transmissions in the first hop (from $S_1$ to $S_2$) and $$\frac{1}{\left(1 - P_{m,2}^{QS}\right)}$$

transmissions in the second hop (from $S_2$ to the destination) to get one packet through. Hence, on the average, the first hop transmission takes $$\frac{B}{\left(1 - P_{m,in}^{QS}\right)K_1 R_s R}$$

seconds and the second hop takes $$\frac{B}{\left(1 - P_{m,2}^{QS}\right)K_2 R_s R}$$

seconds. Summing these up from the source to the destination, it takes $$\frac{B}{\left(1 - P_{m,in}^{QS}\right)K_1 R_s R} + \frac{B}{\left(1 - P_{m,2}^{QS}\right)K_2 R_s R}$$

seconds in total for each packet to get through successfully. Then the data throughput of $S_1$ in multi-hop is:

$$\Gamma_{mhop} = \frac{B}{\frac{B}{\left(1 - P_{m,in}^{QS}\right)K_1 R_s R} + \frac{B}{\left(1 - P_{m,2}^{QS}\right)K_2 R_s R}} = \frac{R_s R}{\frac{1}{\left(1 - P_{m,in}^{QS}\right)K_1} + \frac{1}{\left(1 - P_{m,2}^{QS}\right)K_2}}$$

We find from the above equation that as $P_{m,in}^{QS}$ and $P_{m,2}^{QS}$ depend on the channel quality from $S_1$ to $S_2$ and from $S_2$ to the destination independently, $S_1$ and $S_2$ adapt their modulation rates $K_1$ and $K_2$ based on channel qualities of $S_1$-to-$S_2$ and $S_2$-to-destination independently.

For coded cooperative transmission, as illustrated in FIG. 2D, in the first transmission of coded cooperation, $S_i$ transmits half of the coded bits to the destination and $S_j$, where i≠j, i, j∈{1,2}. If $S_i$ decodes information bits sent by $S_j$ correctly, $S_j$ sends the other half of the coded bits to the destination. If there is an error at the destination, all successive packets are transmitted cooperatively by $S_i$ and $S_j$. If, on the other hand, $S_j$ cannot decode $S_i$'s information, $S_i$ continues transmitting the remaining coded bits. In this case, all re-transmissions will come directly from the source. This allows us to free up the partner's sources quickly while still enjoying the benefits of cooperation. Let $P_{f,i}^{QS}$ denote the FER for the quasi-static $S_i$-to-destination channel, $P_{f,i}^{in}$ denote the FER of the first half channel code for the quasistatic channel of $S_i$-to-$S_j$ and $P_{f,i}^{BF}$ denote the FER for the cooperative block fading channel when destination receives half of the packet from $S_i$ and the remaining half from $S_j$. When $S_i$ and $S_j$ transmit cooperatively, which happens with probability $(1-P_{f,i}^{in})$, an average of $$\frac{1}{(1 - P_{f,i}^{BF})}$$

retransmissions are needed, with each transmission of a packet taking $$\frac{B}{2M_1 R_s R} + \frac{B}{2M_2 R_s R}$$

seconds. When $S_i$ transmits by itself, which happens with the probability of $P_{f,i}^{in}$, we need an average of $$\frac{1}{(1 - P_{f,i}^{QS})}$$

retransmissions, with each transmission taking $$\frac{B}{M_i R_s R}$$

seconds. Then, $$\Gamma_{coop,i} = \frac{B(1-P_{f,i}^{in})(1-P_{f,i}^{BF})}{\frac{B}{2M_1 R_S R} + \frac{B}{2M_2 R_S R}} + \frac{BP_{f,i}^{in}(1-P_{f,i}^{QS})}{\frac{B}{2M_i R_S R}} \quad (2)$$

$$= \frac{R_S R(1-P_{f,i}^{in})(1-P_{f,i}^{BF})}{\frac{1}{2M_1} + \frac{1}{2M_2}} + \frac{R_S R P_{f,i}^{in}(1-P_{f,i}^{QS})}{\frac{1}{2M_i}}$$

Since $S_1$ and $S_2$ may use different modulation modes, $P_{f,1}^{in}$ may not be equal to $P_{f,2}^{in}$.

Comparing the direct transmission and cooperative transmission schemes, $P_{f,i}^{QS}$ is not necessarily equal to $\hat{P}_{f,i}^{QS}$ as $S_i$ may have a different modulation scheme for non-cooperative (direct) transmission and cooperative scheme. Note that in multi-hop, $S_1$ transmits all the coded bits to $S_2$ with transmit energy $\epsilon/2$ per symbol, but in coded cooperation, $S_1$ sends only half of the coded bits to $S_2$ with transmit energy $\epsilon$ per symbol. Hence, $P_{m,in}^{QS}$ is different from $P_{f,i}^{in}$. It can be observed from Eqn. (2) that the throughput of $S_i$ in coded cooperative system depends on $P_{f,i}^{BF}$, $P_{f,i}^{QS}$ and $P_{f,i}^{in}$, these FER probabilities depend on all three link SNRs, $\gamma_1$, $\gamma_2$ and $\gamma_{12}$. Therefore, to optimize $\Gamma_{coop}$, $S_1$ and $S_2$ should base their modulation not only on their own channel quality to the destination but on all these links.

It has been shown that cooperation benefits the user under certain conditions when $$\left(\frac{P_{f,i}^{BF}}{P_{f,i}^{QS}} < 1\right),$$

see Zinan Lin, et al. "An Asymptotic Analysis On the Performance of Coded Cooperation Systems," Proc. IEEE Vehicular Technology Conference, Los Angeles, Fall 2004, the entire contents of which are hereby incorporated by reference.

The following sections define the user throughput gain in order to measure the throughput improvement obtained from cooperation. Assume cooperating users $S_1$ and $S_2$ adapt their modulation modes based on the quality of their channel to the destination when in cooperative communication. For the cooperation between them using a fixed channel code, the data throughput gain for $S_i$ due to cooperation is defined as $$G_{\Gamma,i} = \frac{\Gamma_{coop,i}}{\Gamma_{no-coop,i}} = \frac{2(1-\hat{P}_{f,i}^{in})(1-P_{f,i}^{BF})}{N_i\left(\frac{1}{M_i} + \frac{1}{M_j}\right)(1-\hat{P}_{f,i}^{QS})} + P_{f,i}^{in}\frac{M_i}{N_i}\frac{1-P_{f,i}^{QS}}{1-\hat{P}_{f,i}^{QS}} \quad (3)$$

where $N_i, M_i, M_j \in \{1, 2, 4, 6\}$, $i \neq j$, $i$ and $j \in \{1, 2\}$. Based on this definition, that when $G_{\Gamma,i} > 1$, cooperation improves the data throughput for $S_i$ and the overall data rate for $S_i$ is increased. Please note if both partnering users use the same modulation rate and fix it, i.e., $M_i = N_i = M_j$, then throughput gain due to cooperation is equivalent to FER gain due to cooperation. All the results on how the channel qualities affect the FER gain is valid in this context.

Proposition 1a: A user benefits from coded cooperation in terms of throughput, that is $G_{\Gamma,i} > 1$, if and only if $$\theta_{f,i} = \frac{P_{f,i}^{BF}}{P_{f,i}^{QS}} < 1.$$

Proposition 2a: If $$\theta_{f,i} = \frac{P_{f,i}^{BF}}{P_{f,i}^{QS}} < 1,$$

then $G_{\Gamma,i}$ is an increasing function of $\gamma_{in}$ (or decreasing function of $P_{f,1}^{in}$, that is, the cooperation gain increases as the inter-user channel quality improves.

Without loss of generality, only $S_1$ is considered in the flowing propositions:

Proposition 3a (Partner has good link quality): Assuming fixed received SNR for $S_1$ at the destination and for the inter-user channel, that is, $\gamma_1$ and $\gamma_{in}$ are fixed, the cooperation gain for $S_1$, $G_{\Gamma,1} > 1$, is an increasing function of $\gamma_2$. As $\gamma_2 \Rightarrow \infty$, $G_{\Gamma,1} > 1$, that is cooperation benefits $S_1$, irrespective of $\gamma_1$ and $\gamma_{in}$. Hence, it is always beneficial to cooperate with a good user in terms of throughput.

Proposition 4a (User has good link quality): Suppose $\gamma_2$ and $\gamma_{in}$ are fixed. Then, $G_{\Gamma,1}$ a decreasing function of $\gamma_1$. As $\gamma_1 \Rightarrow \infty$, $G_{\Gamma,i}$ if and only if $\gamma_2 \geq \gamma^*_2$, where the threshold $\gamma^*_2$ only depends on the channel code used. Hence irrespective of the inter-user channel quality, cooperation benefits the good user only when the partner has a received SNR above a certain threshold.

Proposition 5a (Symmetric users with good link qualities): Consider coded cooperation among users $S_1$ and $S_2$, both of which have similar channel qualities to the destination, that is $\gamma_1 \approx \gamma_2 = \gamma$. We assume $\gamma_{in}$ is fixed. Then cooperation gain for each user, $G_{\Gamma,1}$ or $G_{\Gamma,2}$ is an increasing function of $\gamma$. As $\gamma \Rightarrow \infty$, $G_{\Gamma,i} > 1$ irrespective of $\gamma_{in}$. Hence, cooperation among two good users always benefits both of them.

However, in order to improve the throughput of the system more efficiently, users select their modulation rates based on their different channel qualities, that is, $M_i$ is not necessarily identical to $M_j$ or $N_i$. Therefore, the equivalence between FER gain and throughput gain due to cooperation does not hold any more. However, how the partner's received SNR affects the throughput gain and FER gain are similar.

Without loss of generality, $S_1$ is the focus in all the following discussions.

Proposition 1: For fixed $\gamma_1$ and $\gamma_{in}$ ($P_{f,1}^{in}$) and selected $N_1$, $M_1$ and $M_2$, $G_{\Gamma,1}$ increases with $\gamma_2$.

Proof: For fixed $\gamma_1$ and $\gamma_{in}$ ($P_{f,1}^{in}$) and selected $N_1$, $M_1$ and $M_2$, all the terms in (3) are fixed except $P_{f,1}^{BF}$. With the increasing of $\gamma_2$, $1-P_{f,1}^{BF}$ increases as well. Therefore, the throughput gain of $S_1$, $G_{\Gamma,1}$ is improved by increasing $\gamma_2$.

Proposition 1 shows that when a partner is in a better situation, the throughput gain increases. In other words, cooperating with a "better" partner brings more benefits to the original user, where better means a better quality channel to the destination.

In the following sections, it is assumed that only a partner adapts its modulation rate to its channel conditions and a source keeps its modulation mode unchanged, that is $M_1 = N_1$.

Proposition 2: When users $S_1$ 201 and $S_2$ 202 use a modulation rate with $M_1$ bits/symbol and $M_2$ bits/symbol, respectively, during cooperation, user 1 obtains a throughput gain from cooperation, i.e., $G_{\Gamma,1} > 1$ if and only if $$\Theta_{M_1} \frac{1 - P_{f,1}^{BF}}{1 - P_{f,1}^{QS}}$$

where $$\Theta_{M_1} = \frac{2}{\frac{M_1}{M_2} + 1} \quad (4)$$

Proof: The source fixes its modulation mode and hence, $P_{f,1}^{QS} = \hat{P}_{f,1}^{QS}$. Using the definition of $G_{\Gamma,1}$, we can easily obtain $\lessgtr G_{\Gamma,1}$ $$1 \Leftrightarrow \Theta_{M_1} \begin{matrix}< \\ >\end{matrix} \frac{1 - P_{f,1}^{BF}}{1 - P_{f,1}^{QS}} 1.$$

Based on Proposition 1, when the source does not change its modulation rate during cooperation, the throughput gain due to cooperation depends only on $$\Theta_{M_1} \frac{1 - P_{f,1}^{BF}}{1 - P_{f,1}^{QS}}$$

and the quality of the inter-user channel (which results in different values of $P_{f,1}^{in}$) does not determine whether or not the source gets throughput benefits from cooperation. This is consistent with the result given in Zinan Lin, et al. "An Asymptotic Analysis On the Performance of Coded Cooperation Systems," Proc. IEEE Vehicular Technology Conference, Los Angeles, Fall 2004, that whether the FER of user i due to cooperation is improved or not depends only on $$\Theta_f = \frac{P_{f,i}^{BF}}{P_{f,i}^{QS}}$$

and is not related to the inter-user channel quality. However, how much throughput benefits can be obtained through cooperation is determined by the channel quality of the inter-user channel.

Using the condition under which the user gets benefits from cooperation as defined in Zinan Lin, et al. "An Asymptotic Analysis On the Performance of Coded Cooperation Systems," Proc. IEEE Vehicular Technology Conference, Los Angeles, Fall 2004, ($\theta_f < 1$) in terms of FER and Proposition 2, the following relationship between throughput gain and FER gain due to cooperation:

Proposition 3: Consider the coded cooperation between $S_1$ and $S_2$, in which $S_1$ fixes its modulation mode and $S_2$ changes its modulation mode based on channel qualities. When $S_2$ uses a higher modulation rate than $S_1$, i.e., $M_2 < M_1$, the FER improvement for $S_1$ due to cooperation guarantees that $S_1$ has a higher throughput resulting from cooperation, i.e., $P_{f,1}^{coop} < P_{f,1}^{no\text{-}coop} \Rightarrow G_{\Gamma,1} > 1$. However, when $S_2$ uses lower modulation rate than $S_1$, i.e., $M_2 < M_1$, if cooperation brings $S_1$ a higher throughput, then cooperation must improve $S_1$'s FER performance as well, i.e., $G_{\Gamma,1} > 1 \Rightarrow P_{f,1}^{coop} < P_{f,1}^{no\text{-}coop}$.

Proof: It is shown in Zinan Lin, et al. "An Asymptotic Analysis On the Performance of Coded Cooperation Systems," Proc. IEEE Vehicular Technology Conference, Fall 2003 that for coded cooperation as described in FIG. 1, $P_{f,1}^{coop} < P_{f,1}^{no\text{-}coop}$ if and only if $P_{f,1}^{BF} < P_{f,1}^{QS}$.

For the case of $M_2 > M_1$ and $\theta_{M_1} > 1$, when $$P_{f,1}^{coop} < P_{f,1}^{no\text{-}coop}, \frac{1 - P_{f,1}^{BF}}{1 - P_{f,1}^{QS}} > 1$$

and using Proposition 2, $$\Theta_{M_1} \frac{1 - P_{f,1}^{BF}}{1 - P_{f,1}^{QS}} > 1 \Leftrightarrow G_{\Gamma,1} > 1 \bigg).$$

For the case of $M_2 < M_1$ and $\theta_{M_1} < 1$, if $G_{\Gamma,1} > 1$ then $$\Theta_{M_1} \frac{1 - P_{f,i}^{BF}}{1 - P_{f,i}^{QS}} > 1$$

and hence, $$\frac{1 - P_{f,i}^{BF}}{1 - P_{f,i}^{QS}}$$

must be greater than 1 as $\theta_{M_1} < 1$. Therefore, for the case of $M_1 > M_2$ having $G_{\Gamma,1} > 1$ guarantees $$\frac{P_{f,i}^{BF}}{P_{f,i}^{QS}} < 1 \text{ and } P_{f,1}^{coop} < P_{f,1}^{no\text{-}coop}.$$

The following sections show how the received SNR's of the original user affects its throughput gain when it keeps the same modulation mode in cooperation as the one in its individual communication with the destination:

Proposition 4: For fixed $\gamma_2$ and $\gamma_{in}$ ($P_{f,2}^{in}$) and selected $M_1$ and $M_2$, if cooperation leads to less FER for the source, i.e., $P_{f,1}^{coop} < P_{f,1}^{no\text{-}coop}$, then the data throughput gain of $S_1$, which is $G_{\Gamma,1}$, decreases as $\gamma_1$ increases.

Proof: We have $$\frac{\partial G_{\Gamma,1}}{\partial \gamma_1} = \Theta_{M_1}(1 - P_{f,1}^{in}) \left[ \frac{\frac{1}{(P_{f,1}^{QS})^2} \frac{\partial P_{f,1}^{QS}}{\partial \gamma_1}(1 - \Theta_{f,1}) + \frac{\partial \Theta_{f,1}}{\partial \gamma_1}\left(1 - \frac{1}{P_{f,1}^{QS}}\right)}{\left(\frac{1}{P_{f,1}^{QS}} - 1\right)^2} \right] \quad (5)$$

where $$\Theta_{f,1} = \frac{P_{f,1}^{BF}}{P_{f,1}^{QS}}.$$

It has been shown in Zinan Lin, et al. "An Asymptotic Analysis On the Performance of Coded Cooperation Systems," Proc. IEEE Vehicular Technology Conference, Fall 2003, that for fixed $\gamma_{in}$ and $\gamma_2$ that $\theta_{f,1}$ is an increasing function of $\gamma_1$. Therefore $$\frac{\partial G_{\Gamma,1}}{\partial \gamma_1} > 0.$$

From the fact that $P_{f,1}^{QS} < 1$ and the equivalence of $P_{f,1}^{coop} < P_{f,1}^{no-coop} \Leftrightarrow \theta_{f,1} < 1$, it follows that $$\frac{\partial G_{\Gamma,1}}{\partial \gamma_i} < 0.$$

Therefore, $G_{\Gamma,1}$ decreases with $\gamma_1$.

Based on Proposition 4, if the cooperative coding benefits the original user in terms of FER, then the throughput gain due to cooperation decreases with the improvement of the source's channel quality. However, if cooperation does not bring benefits to the source in terms of FER ($\theta_{f,1} > 1$), it is difficult to determine how the throughput gain of the source changes when its channel quality improves.

In the following sections, the partner keeps the same modulation mode as the one when it communicates with the destination individually but the source changes its modulation mode dynamically. Since the source may use different modulation modes from the one in its individual communication with the destination, $M_1$ is not necessarily same as $N_1$ then $P_{f,1}^{no-coop}$ is not always equal to $P_{f,1}^{qs}$. Based on (3), it follows that if the source adapts its modulation mode, the throughput gain of the source due to cooperation is dependent on the FER of the inter-user channel, which is different from the case that the source fixes its own modulation mode. Therefore, whether the cooperation improves the source's throughput or not depends on the inter-user channel quality if the source adapts its modulation rate during cooperation.

The following is an analysis of the case where the source fixes its modulation mode and the partner changes its modulation mode that investigates the optimal modulation modes that can be used by the partner in different ranges of SNRs such that the data throughput for the source is maximized.

In Zinan Lin, et al. "An Asymptotic Analysis On the Performance of Coded Cooperation Systems," Proc. IEEE Vehicular Technology Conference, Fall 2003, it has been shown that cooperating with a user having good channel quality to the destination always benefits the source. In such a situation, the partner may take advantage of its good channel quality and may choose a higher modulation mode such that the overall data rate to the destination can be increased.

Next, it is determined whether or not a higher modulation rate alone used by the partner increases throughput of the system or whether the selection of the modulation rate of the partner also depends on the source's SNR.

Without loss of generality, the case where $M_1 \leq M_2$ is considered first. The following sections investigate (a) the partner selects its modulation mode based only on its own channel quality, (b) the original user's channel quality also affects the partner's modulation rate choice and (c) the partner selects the best modulation rate depending on different ranges of SNRs. Finally, an analysis is presented of combining these three cases with the case of $M_1 > M_2$ to determine the best modulation rate pair for the partnering users at the different ranges of SNR pairs for these two users such that the choice maximizes the throughput gain for the source. As $M_1, M_2 \in \{1, 2, 4\}$ and $M_1 \leq M_2$, we have six possible values of $\theta_{M_1}$. In the coded cooperative algorithm, the first half of the coded bits is sent by the source and is received by both the partner and the destination. If the coded bits are successfully decoded by the partner, the partner helps the original user transmit the other half of the coded bits. Otherwise, the source continues its own transmission. Therefore, in order to improve the successful decoding probability of the first half coded bits sent by the source, assume that the source's modulation mode is fixed to BPSK, i.e., $M_1=1$. Please note that the source may use another modulation rate if its channel quality to the destination is good. Also, when $M_1=1$, $M_2$ has more choices for its value under the condition $M_1 \leq M_2$. Using (4), when $M_2=1, 2, 4$ respectively results in $$\Theta_{M_1}^1 = \frac{1}{2}, \Theta_{M_1}^2 = \frac{2}{3}, \Theta_{M_1}^3 = \frac{4}{5}$$

and we refer to $G_\Gamma^n$ as the corresponding throughput gain for the respective case with the value of $\theta_{M_1}^n$, where $n=1, 2, 3$ corresponds to $M_2=1, 2, 4$, respectively. Now the problem becomes that for $M_1=1$ and given $\gamma_1$ and $\gamma_2$, how to select the best modulation rate, $M_2$, with the goal of choosing the largest value of $G_\Gamma^n$. For comparing values of $G_\Gamma^n$ at given $\gamma_1$ and $\gamma_2$, since the channel qualities of the inter-user channel and the source to the destination channel are the same, $P_{f,1}^{in}$ and $P_{f,1}^{QS}$ for the source are unchanged. However, the value of $P_{f,1}^{BF,n}$ is different due to the different value of $M_2$ where $P_{f,1}^{BF,n}$ is the FER for the cooperative block fading channel with different value of $M_2$ and $n=1, 2, 3$ represents $M_2=1, 2, 4$, respectively. Therefore, $$G_\Gamma^n = 2\frac{(1-P_f^{in})}{(1-P_{f,1}^{QS})}\Theta_{M_1}^n(1-P_{f,1}^{BF,n}) + P_{f,1}^{in} \qquad (6)$$

Comparing values of $G_\Gamma^n$ by using (6), the following conditions hold:

1) $G_T^1 \gtrless G_T^2 \Leftrightarrow P_{f,1}^{BF,2} \gtrless \Lambda_{12}$ where $\Lambda_{12} = \frac{1}{4} + \frac{1}{2}P_{f,1}^{BF,1}$ (7)

2) $G_T^1 \gtrless G_T^3 \Leftrightarrow P_{f,1}^{BF,3} \gtrless \Lambda_{13}$ where $\Lambda_{13} = \frac{3}{8} + \frac{5}{8}P_{f,1}^{BF,1}$ (8)

3) $G_T^2 \gtrless G_T^3 \Leftrightarrow P_{f,1}^{BF,3} \gtrless \Lambda_{23}$ where $\Lambda_{23} = \frac{1}{6} + \frac{5}{6}P_{f,1}^{BF,2}$ (9)

For any given $\gamma_1$ and $\gamma_2$, comparing $\Lambda_{12}, \Lambda_{13}$, and $\Lambda_{23}$ we have $$\Lambda_{12} < \Lambda_{13} \qquad (10)$$

It is shown in J. Proakis, Digital Communications, 4th Edition, McGraw-Hill, New York, 2001 pp. 264-272, the entire contents of which is hereby included by reference, that higher modulation rate leads to higher error rate. Therefore, $$P_{f,1}^{BF,1} < P_{f,2}^{BF,2} < P_{f,1}^{BF,3} \qquad (11)$$

Combining inequalities (10) to (11) and conditions 1 to 3, we obtain the following results under the assumption that the original user uses BPSK modulation:
1) If $P_{f,1}^{BF,3} > \Lambda_{13}$ and $P_{f,1}^{BF,2} > \Lambda_{12}$, $G_T^1$ is the largest, that is, throughput is maximized if the
   partner uses BPSK modulation mode.
2) If $P_{f,1}^{BF,3} > \Lambda_{13}$ and $P_{f,1}^{BF,2} < \Lambda_{12}$, $G_T^2$ is the largest, that is, throughput is maximized if the
   partner uses QPSK modulation mode.

3) If $P_{f,1}^{BF,3}<\Lambda_{13}$ and $P_{f,1}^{BF,2}>\Lambda_{12}$, $G_T^3$ is the largest, that is, throughput is maximized if the
partner uses 16-QAM modulation mode.
4) If $P_{f,1}^{BF,3}<\Lambda_{13}$ and $P_{f,1}^{BF,2}<\Lambda_{12}$, $G_T^2$ is the largest, that is, throughput is maximized if the
partner uses QPSK modulation mode; otherwise $G_T^3$ is the largest, that is, throughput is
maximized if the partner uses 16-QAM modulation mode. The above results provide the means for determining the proper modulation rate used by the partner such that the data throughput of the source is optimized. They show that not only the partner's channel quality but also the source's channel quality affect the selection of the partner modulation rate. They also require that the source consider its partner's channel quality as well when the source selects its modulation rate, with the goal of maximizing its data throughput.

One skilled in the art will readily be able to extend the foregoing results to any modulation mode used by the original user. For example, if the source uses QPSK, result 4 can be applied, that is if $P_{f,1}^{BF,3}>\Lambda_{23}$, $G_T^2$ is the largest and the throughput is maximized if the partner uses QPSK modulation mode; otherwise, $G_T^3$ is the largest and 16-QAM modulation mode selected by the partner brings the largest throughput to the original user. On the other hand, if the source has a higher modulation rate than the partner, the values of $\theta_{M_1}^n$ change. But, the above algorithm is used to determine the conditions under which the selected modulation rate used by the partner is the best, with the goal of maximizing the source's data throughput.

In this section, the discussion focuses on the situation when the source fixes its modulation mode as QPSK or 16-QAM and how a partner adapts its modulation mode such that the source's throughput is maximized. Similar to the case when the source uses BPSK, when the source uses QPSK, $\Lambda_{12}$, $\Lambda_{13}$, and $\Lambda_{23}$ become $$\Lambda_{12} = \frac{1}{3} + \frac{2}{3}P_{f,1}^{BF,1}, \Lambda_{13} = \frac{1}{2} + \frac{1}{2}P_{f,1}^{BF,1} \text{ and } \Lambda_{23} = \frac{1}{4} + \frac{3}{4}P_{f,1}^{BF,2}.$$

For any given $\gamma_1$ and $\gamma_2$, we have $$\Lambda_{12}<\Lambda_{13} \tag{12}$$

and $$P_{f,1}^{BF,1}<P_{f,1}^{BF,2}<P_{f,1}^{BF,3} \tag{13}$$

Using inequalities (12) to (13) we obtain the following results under the assumption that the original user uses QPSK modulation:
1) If $P_{f,1}^{BF,3}>\Lambda_{13}$ and $P_{f,1}^{BF,2}>\Lambda_{12}$, $G_T^1$ is the largest, that is, throughput is maximized if the
partner uses BPSK modulation mode.
2) If $P_{f,1}^{BF,3}>\Lambda_{13}$ and $P_{f,1}^{BF,2}<\Lambda_{12}$, $G_T^2$ is the largest, that is, throughput is maximized if the
partner uses QPSK modulation mode.
3) If $P_{f,1}^{BF,3}<\Lambda_{13}$ and $P_{f,1}^{BF,2}>\Lambda_{12}$, $G_T^3$ is the largest, that is, throughput is maximized if the
partner uses 16-QAM modulation mode.
4) when $P_{f,1}^{BF,3}<\Lambda_{13}$ and $P_{f,1}^{BF,2}<\Lambda_{12}$, if $P_{f,1}^{BF,3}>\Lambda_{23}$, $G_T^2$ is the largest, that is throughput is maximized if the partner uses QPSK modulation mode; otherwise $G_T^3$ is the largest, that is 16-Qam modulation mode selected by the partner brings the largest throughput to the source.

When the source uses 16-QAM, $\Lambda_{12}$, $\Lambda_{13}$, and $\Lambda_{23}$ become $$\Lambda_{12} = \frac{2}{5} + \frac{3}{5}P_{f,1}^{BF,1},$$

$$\Lambda_{13} = \frac{3}{5} + \frac{2}{5}P_{f,1}^{BF,1}$$

and $$\Lambda_{23} = \frac{1}{3} + \frac{2}{3}P_{f,1}^{BF,2}.$$

For any given $\gamma_1$ and $\gamma_2$, we still have $$\Lambda_{12}<\Lambda_{13} \tag{14}$$

Using inequalities (13) and (14) we obtain similar results when the source uses 16-QAM:
1) If $P_{f,1}^{BF,3}>\Lambda_{13}$ and $P_{f,1}^{BF,2}>\Lambda_{12}$, $G_T^1$ is the largest, that is, throughput is maximized if the
partner uses BPSK modulation mode.
2) If $P_{f,1}^{BF,3}>\Lambda_{13}$ and $P_{f,1}^{BF,2}<\Lambda_{12}$, $G_T^2$ is the largest, that is, throughput is maximized if the
partner uses QPSK modulation mode.
3) If $P_{f,1}^{BF,3}<\Lambda_{13}$ and $P_{f,1}^{BF,2}>\Lambda_{12}$, $G_T^3$ is the largest, that is, throughput is maximized if the
partner uses 16-QAM modulation mode.
4) when $P_{f,1}^{BF,3}<\Lambda_{13}$ and $P_{f,1}^{BF,2}>\Lambda_{12}$, if $P_{f,1}^{BF,3}>\Lambda_{23}$, $G_T^2$ is the largest, that is, throughput is maximized if the partner uses QPSK modulation mode; otherwise $G_T^3$ is the largest, that is 16-QAM modulation mode selected by the partner brings the largest throughput to the source.

In this section two cases are discussed: the first case is when the partner fixes its modulation rate and how the source adapts its modulation mode, and the second case is both partnering users adapt their modulation modes simultaneously.

In these two cases, as the source changes its modulation mode $P_f^{in}$, $P_{f,1}^{QS}$ and $P_{f,1}^{BF}$ are all changed. It is hard to just base on the throughput gain expression, $G_T$, to tell which modulation pairs used by the partnering users bring the highest throughput, . . . . However, we can proceed as follows: we can simulate the FERs for the cases when the partnering users use different modulation modes for any fixed $\gamma_1$ and $\gamma_2$ and then compute the throughput for these FERs. Then we compare the throughput values when the partnering users use different modulation modes and figure out what the modulation modes used by the users are such that the throughput is maximized for different $\gamma_1$ and $\gamma_2$. In the practical situation, the partnering users may base on the results obtained from simulation to choose the modulation modes to maximize the throughput for different received SNRs ($\gamma_1$ and $\gamma_2$).

In the following sections, numerical results for throughput gain are presented that illustrate how the source's channel qualities affect the data throughput gain, how much throughput gain can be obtained through cooperation, and what further improvement can be obtained by using adaptive modulation according to the system and method of the present invention. In order to simplify the presentation, in all the following simulation examples, only BPSK, QPSK and 16QAM modulation modes are considered and a [5, 7, 5, 7] convolutional code is used as the channel code.

Figure 3:
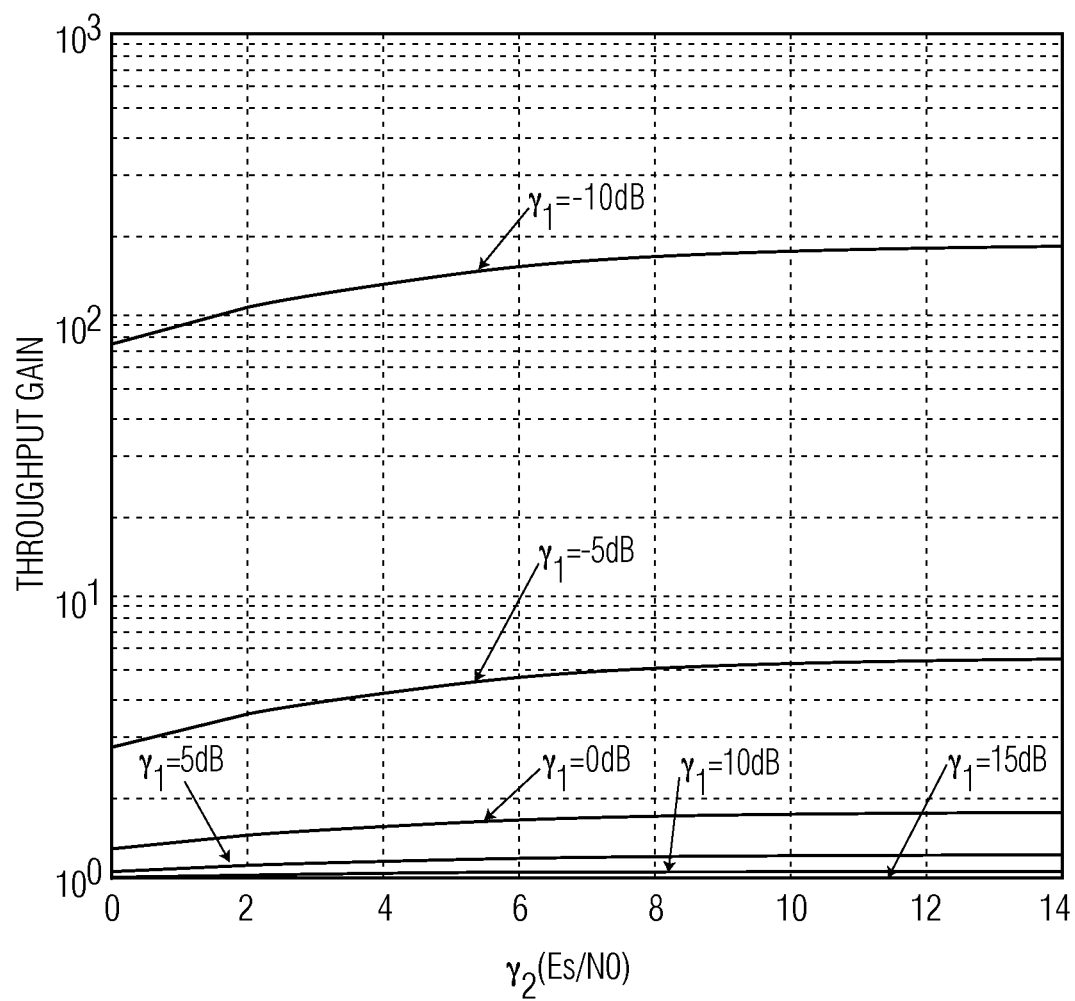
FIG. 3 illustrates data throughput gain for $S_1$ when both the source and the partner use BPSK modulation mode.
Figure 4:
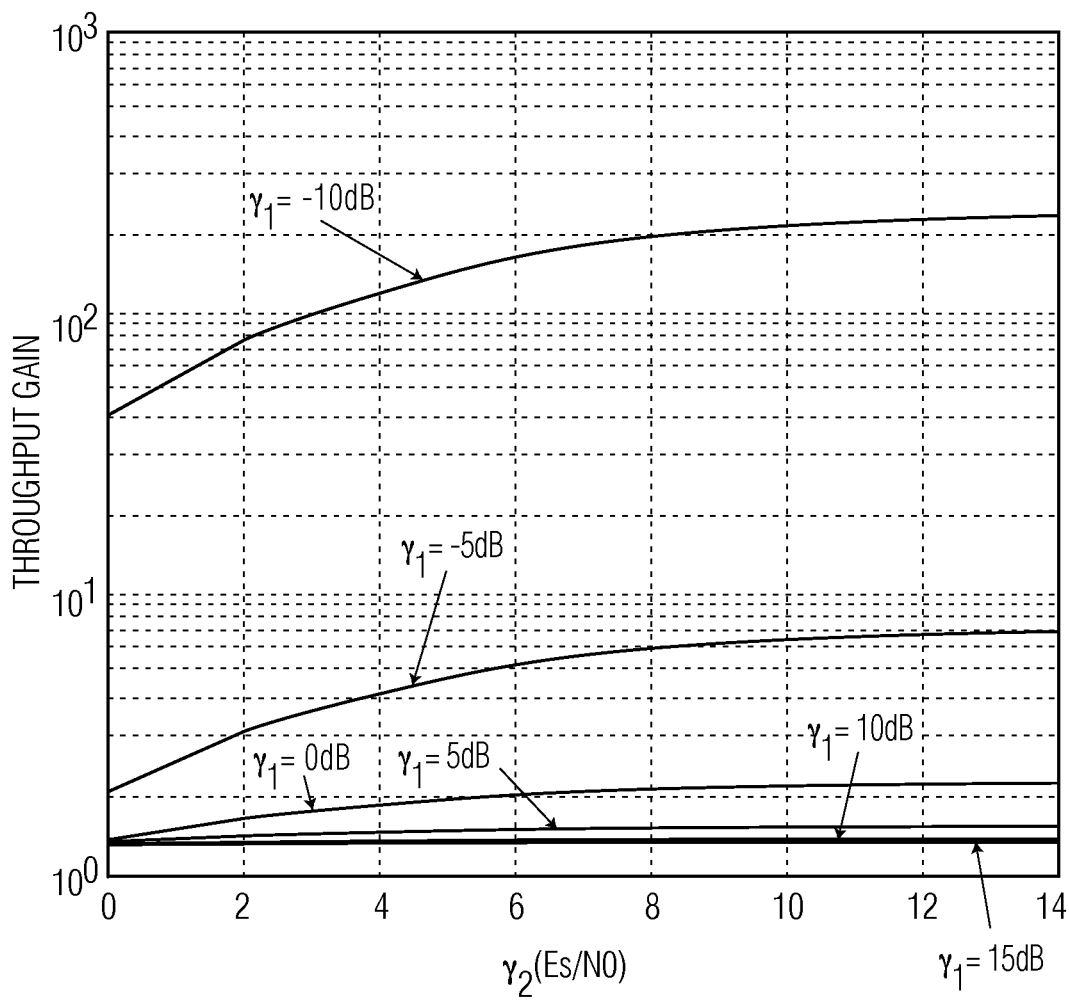
FIG. 4 illustrates data throughput gain for $S_1$ when $S_1$ uses BPSK modulation mode and $S_2$ switches to QPSK modulation mode.
Figure 5:
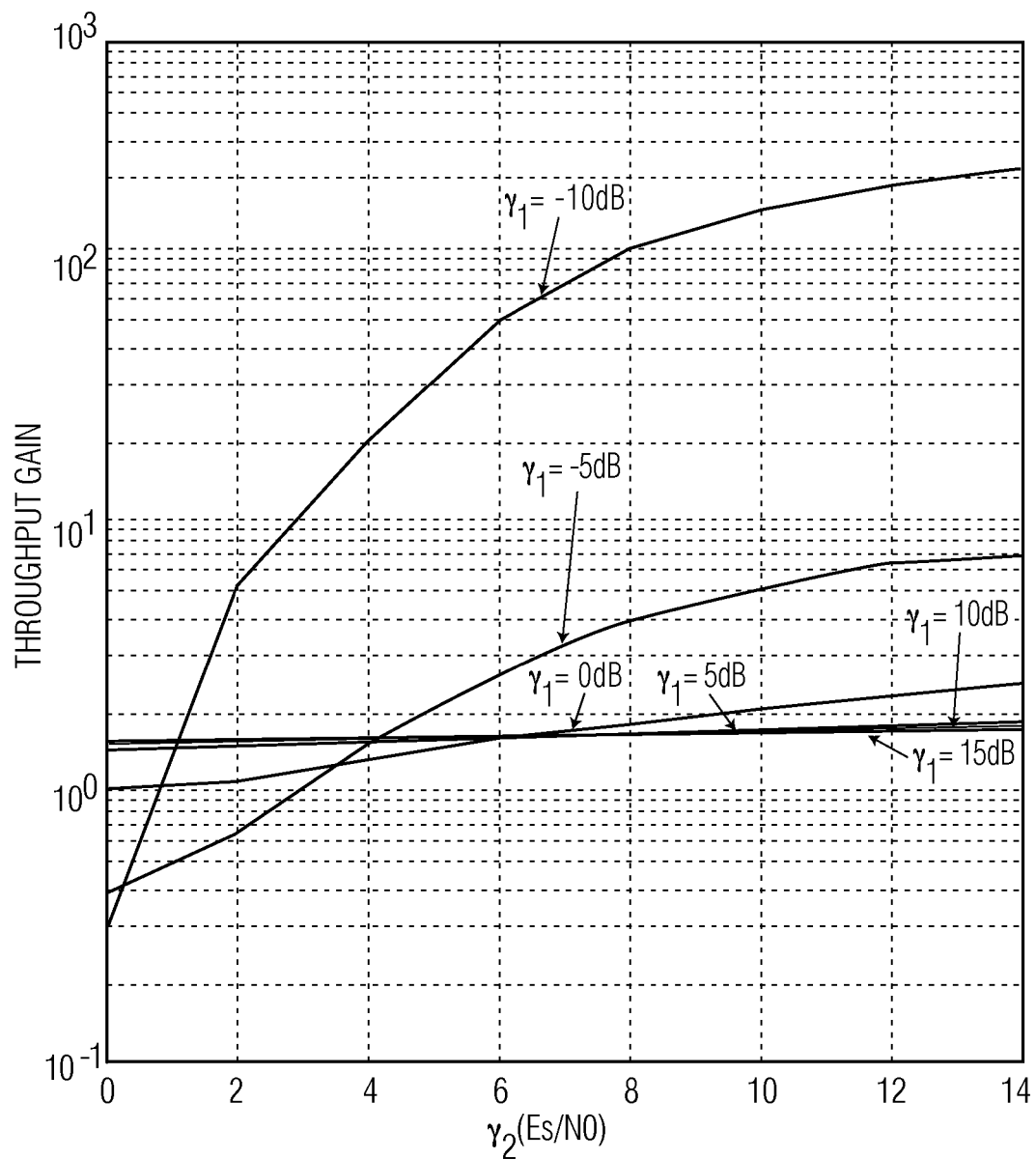
FIG. 5 illustrates data throughput gain for $S_1$ when $S_1$ uses BPSK modulation mode and $S_1$ switches to 16 QAM modulation mode.
Figure 6:
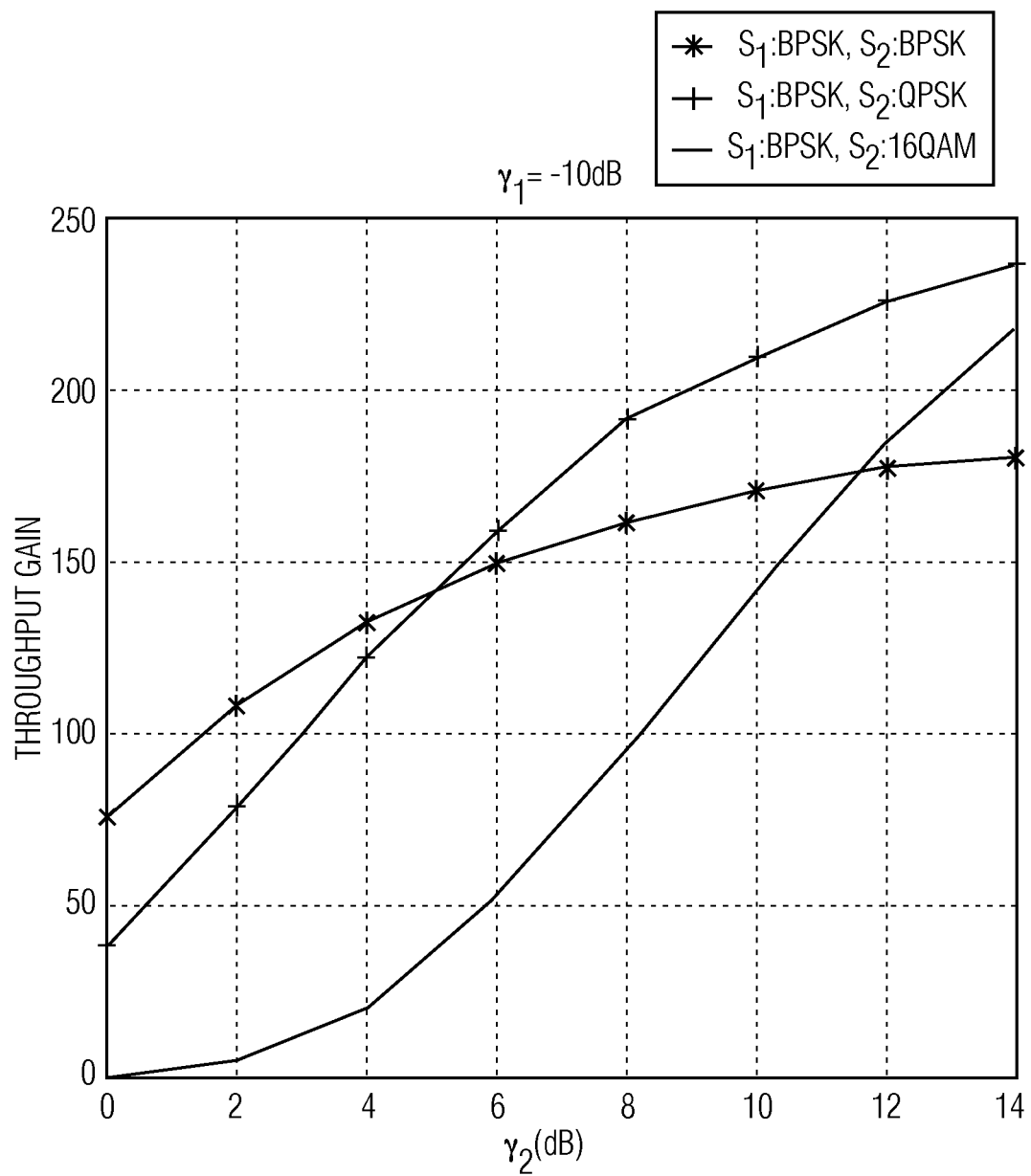
FIG. 6 illustrates for $\gamma_1=-10$ dB, a comparison of the data throughput gain for $S_1$ when $S_1$ uses BPSK modulation mode and $S_2$ uses BPSK, QPSK and 16 QAM, respectively.

Fixed Source Modulation Mode:

We assume perfect inter-user channel, that is $P_f^{in}=0$. In all the examples, we fix $\gamma_1$ as −10 dB, −5 dB, 0 dB, 10 dB, 15 dB respectively and change $\gamma_2$. $S_1$ uses BPSK modulation mode for the non-cooperative communication. We assume perfect inter-user channel. FIGS. 3, 4, 5 show the throughput gain for $S_1$ when $S_1$ fixes its modulation mode as BPSK and $S_2$ uses BPSK, QPSK and 16-QAM modulation mode, respectively. We can determine from these three figures that with the increasing of the partner's SNR ($\gamma_2$), $S_1$'s throughput gain improves more and more for any fixed $\gamma_1$. This is consistent with Proposition 1. When $S_1$ has poor channel quality (low SNR regime), the throughput gain due to cooperation is the largest for any fixed $\gamma_2$. When $S_1$ uses BPSK and $S_2$ uses BPSK and QPSK, $S_1$ get FER benefits from cooperation in the examples provided in FIGS. 3, 4, and 5. We observe from FIGS. 3 and 4 that for any fixed $\gamma_2$, the throughput gain for $S_1$ is decreasing with $\gamma_1$. For the case that $S_1$ uses BPSK and $S_2$ uses 16-QAM, since 16-QAM leads to higher FER compared with BPSK and QPSK modulation modes, the original user only gets benefits from cooperation in terms of FED, i.e. $P^{coop} < P^{no-coop}$, when is high enough (>7.5 dB in this example. Therefore, we can observer from FIG. 5 that when $\gamma_2$>7.5 dB, which results in $P^{coop} < P^{no-coop}$, the throughput gain for $S_1$ is decreasing with $\gamma_1$. This matches Proposition 4. Again, we can observe from FIG. 5 that even when $\gamma_2$<7.5 dB, cooperating with $S_2$ still can improve $S_1$ a lot in terms of throughput when $S_1$ is in a low SNR situation (for example, $\gamma_1$=−10 dB, −5 dB). This illustrates the non-equivalence between FER gain and throughput gain when partnering users have different rates. In short, we conclude from these figures that cooperation improves the original user's throughput much more when
$S_1$ in a low SNR situation; if the partner uses higher modulation mode that the original user, the original user still can get benefits from cooperation in terms of throughput even when its FER is not improved by cooperation.

FIGS. 6-11 compare the data throughput gains of $S_2$ due to cooperation when $S_2$ uses BPSK, QPSK and 16-QAM, respectively, for the cases where $\gamma_1$=−10 dB, −5 dB, 0 dB, 5 dB, 10 dB and 15 dB. Observing these figures, we can find than when $\gamma_1$ is in a very low SNR situation, i.e., $\gamma_1$=−10 dB or −5 dB, for the low $\gamma_2$ values, BPSK modulation mode used by $S_2$ can lead to higher throughput gain of $S_1$. This is because that if both users are experiencing low SNR, lower modulation mode results in lower FER values compared with higher modulation mode. Again, for cases where $\gamma_1$=−10 dB or −5 dB, with the increasing of $\gamma_2$, cooperating with $S_2$ using QPSK modulation will bring the largest throughput gain to $S_1$; when $\gamma_2$ is high enough (i.e., $\gamma_2$>14 dB for $\gamma_1$=−10 dB and $\gamma_2$>13.5 dB for $\gamma_1$=−5 dB). 16-QAM used by $S_2$ gives $S_1$ the highest throughput gain. For the case of $\gamma_1$>0 dB, when $\gamma_2$=−11 dB, cooperating with $S_2$ using QPSK modulation bring the original user the highest throughput; when $\gamma_2$=11 dB, $S_1$ gets the largest throughput benefits from cooperation if $S_2$ uses 16-QAM. This is because although higher modulation mode can transmit more bits every time, when the original user has poor channel quality, the resulting FER from cooperating with the partner having higher modulation mode is very high, which results in lower successful transmission rate for every information bit. When $\gamma_1$ is large, for example $\gamma_1$=5 dB, 10 dB, 15 dB, we can observe from FIGS. 9-11 that 16-QAM used by the partner always brings the largest throughput gain to $S_1$ as long as $\gamma_2$ is not very low. The reason is that when partnering users have good enough channel qualities, the resulting FER doe to higher modulation mode is not very high anymore and hence, higher modulation mode used by the partner gives the original user higher throughput gain. As shown in these figures, we can find that with the goal of maximizing the throughput of the original user, if the partner adapts its modulation rate based on channel qualities, the throughput gain due to cooperation can be increased more and the selection of modulation mode by the partner depends not only on its own channel quality but also the original user's channel quality. Because cooperation involves two users and not only one, when the original user has very low SNR, higher modulation mode used by the partner cannot bring higher throughput gain to the original user; only when the original user has good enough channel quality higher modulation mode used by the partner can make cooperation result in higher throughput gain to the original user.

Figure 7:
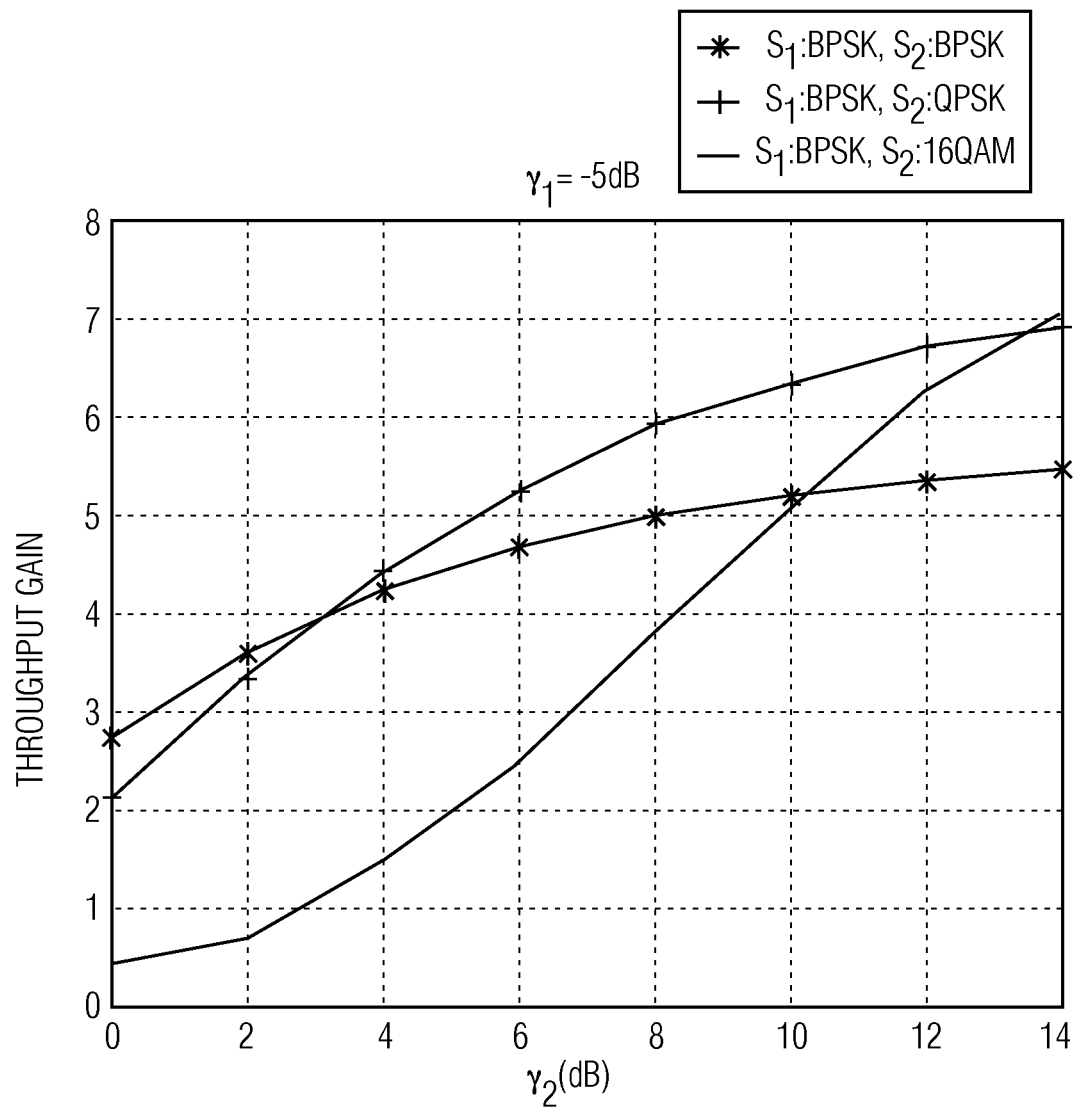
FIG. 7 illustrates $\gamma_1=-5$ dB, a comparison of the data throughput gain for $S_1$ when $S_1$ uses BPSK modulation mode and $S_2$ uses BPSK, QPSK and 16 QAM, respectively.
Figure 8:
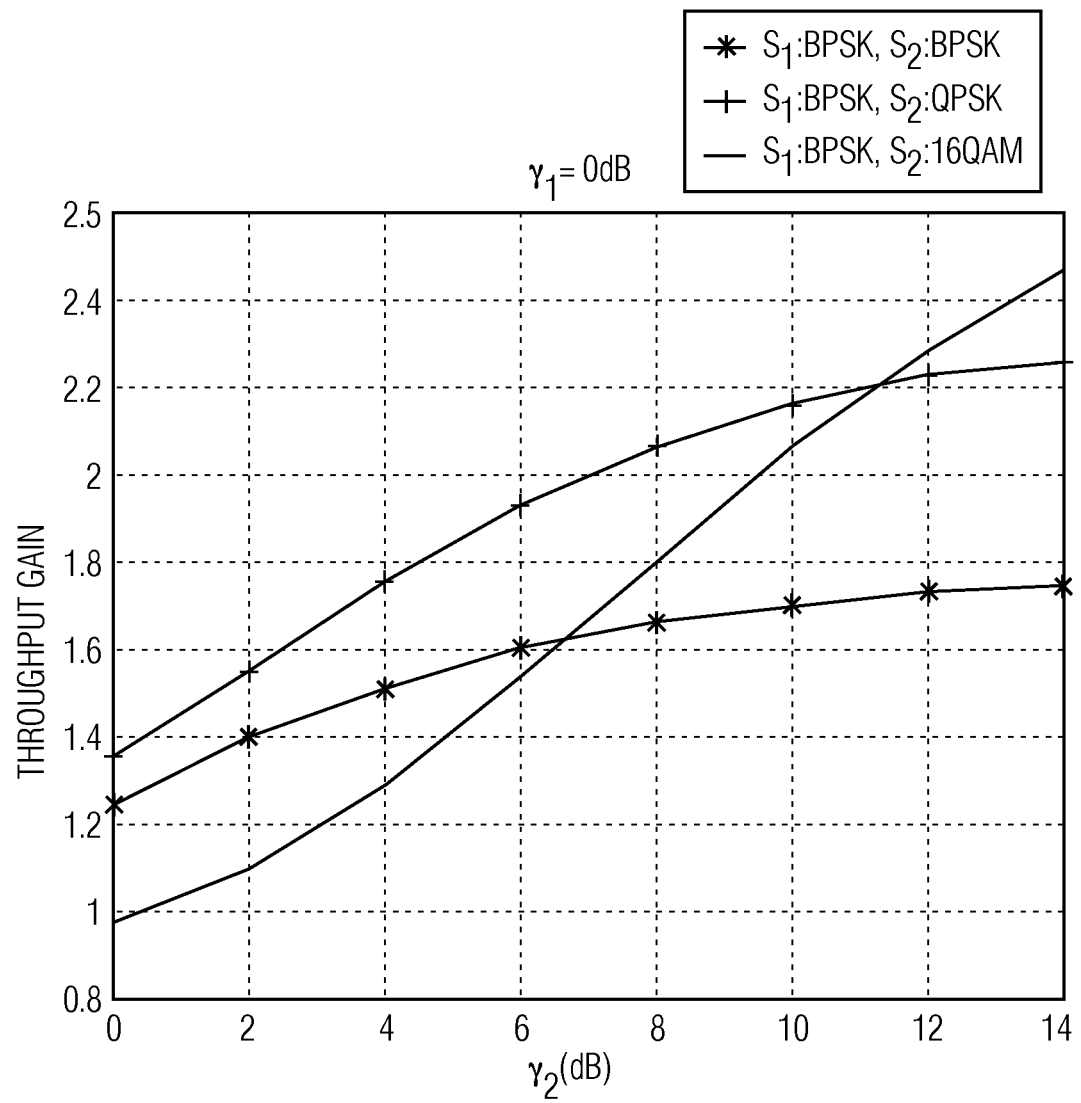
FIG. 8 illustrates $\gamma_1=0$ dB, a comparison of the data throughput gain for $S_1$ when $S_1$ uses BPSK modulation mode and $S_2$ uses BPSK, QPSK and 16 QAM, respectively.
Figure 9:
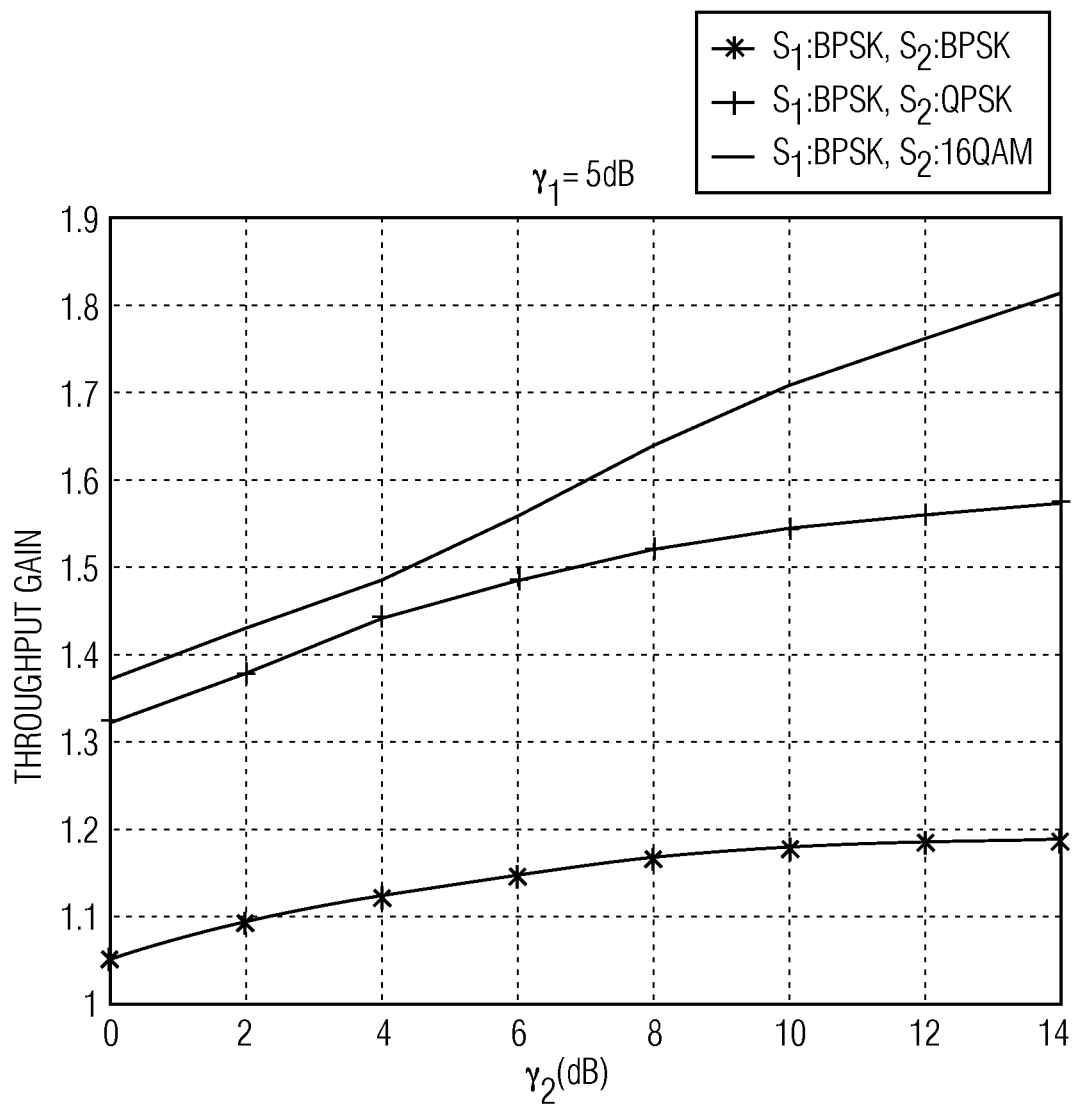
FIG. 9 illustrates $\gamma_1=5$ dB, a comparison of the data throughput gain for $S_1$ when $S_1$ uses BPSK modulation mode and $S_2$ uses BPSK, QPSK and 16 QAM, respectively.
Figure 10:
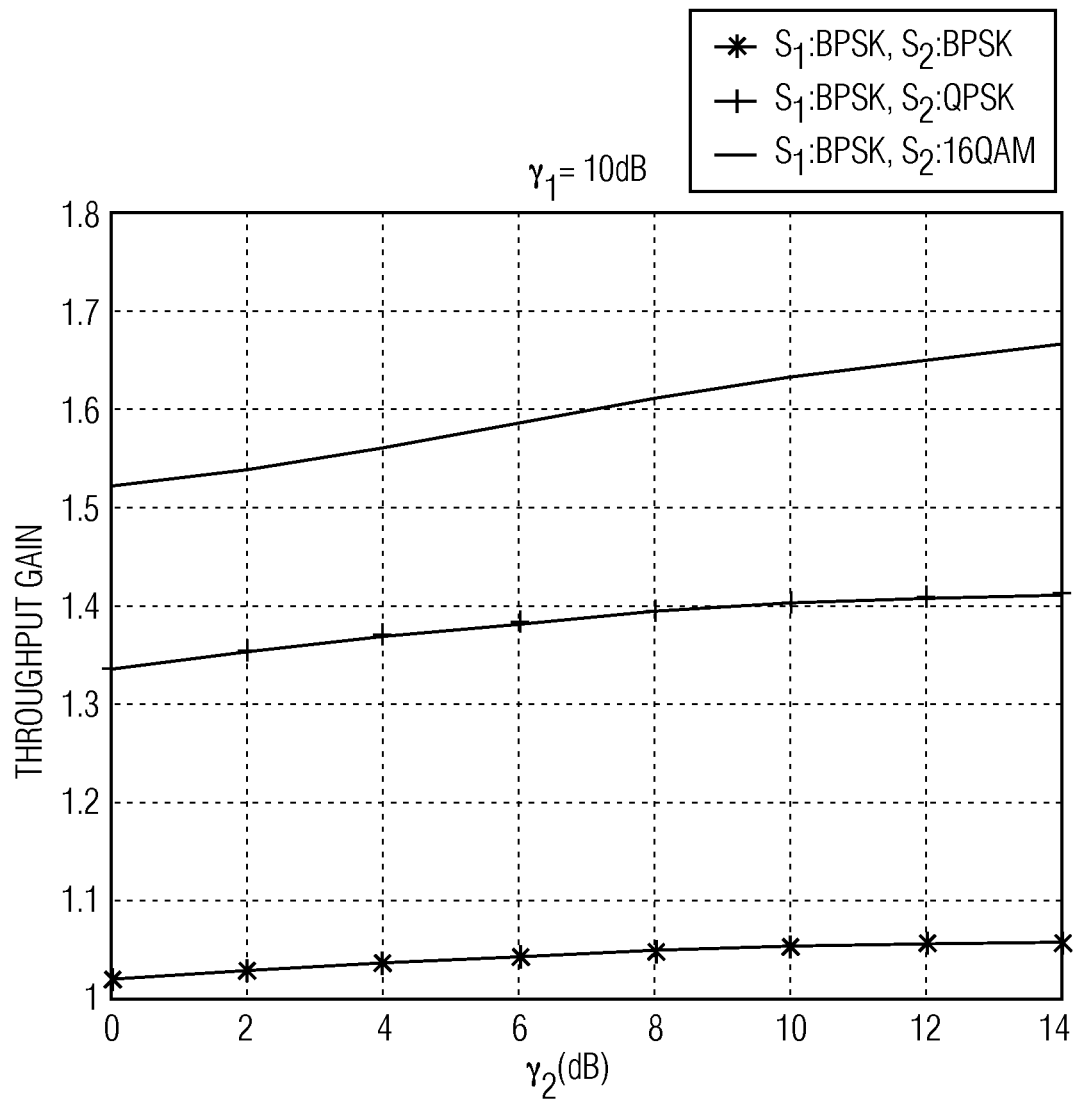
FIG. 10 illustrates $\gamma_1=10$ dB, a comparison of the data throughput gain for $S_1$ when $S_1$ uses BPSK modulation mode and $S_2$ uses BPSK, QPSK and 16 QAM, respectively.
Figure 11:
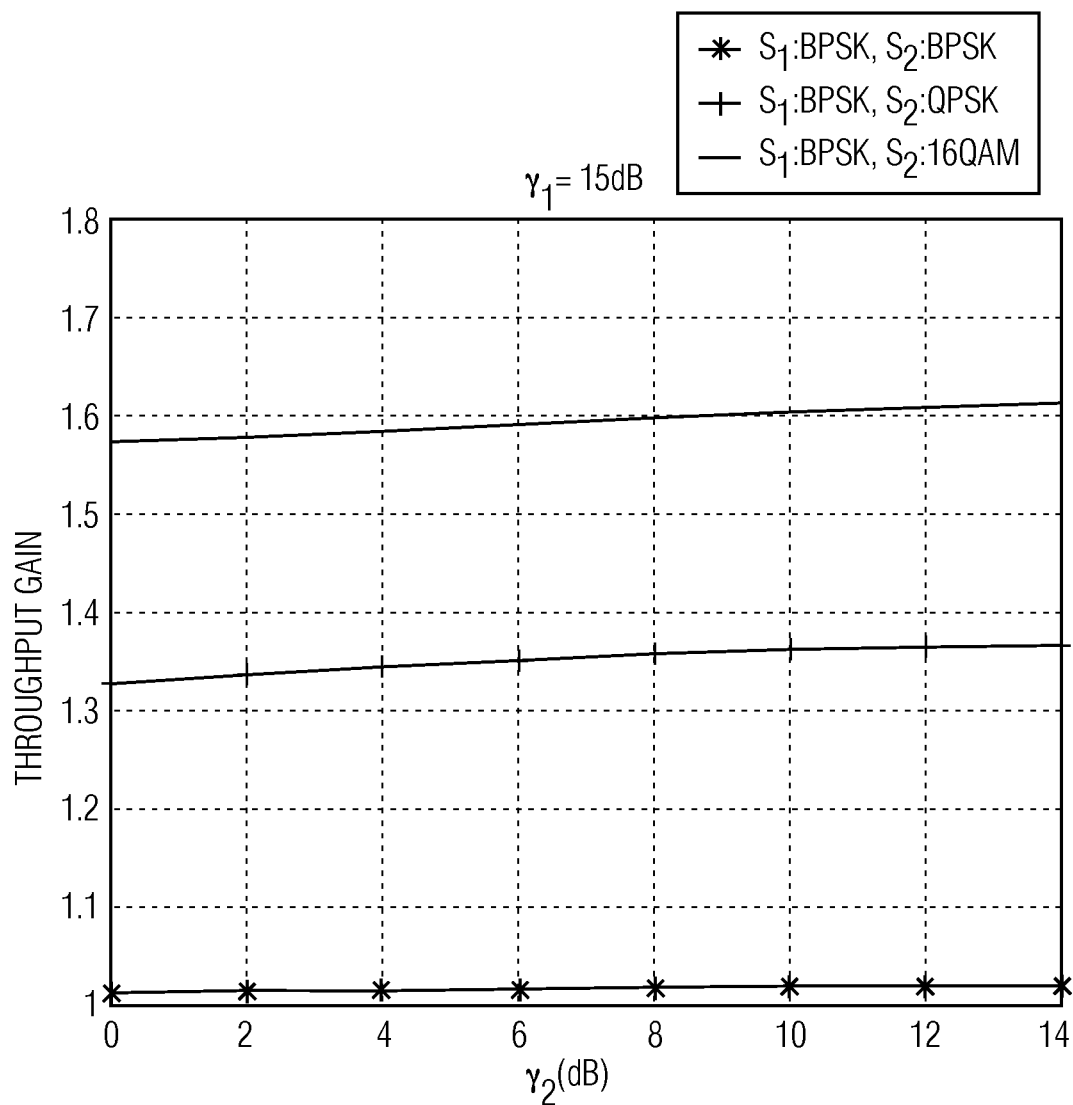
FIG. 11 illustrates $\gamma_1=15$ dB, a comparison of the data throughput gain for $S_1$ when $S_1$ uses BPSK modulation mode and $S_2$ uses BPSK, QPSK and 16 QAM, respectively.
Figure 12:
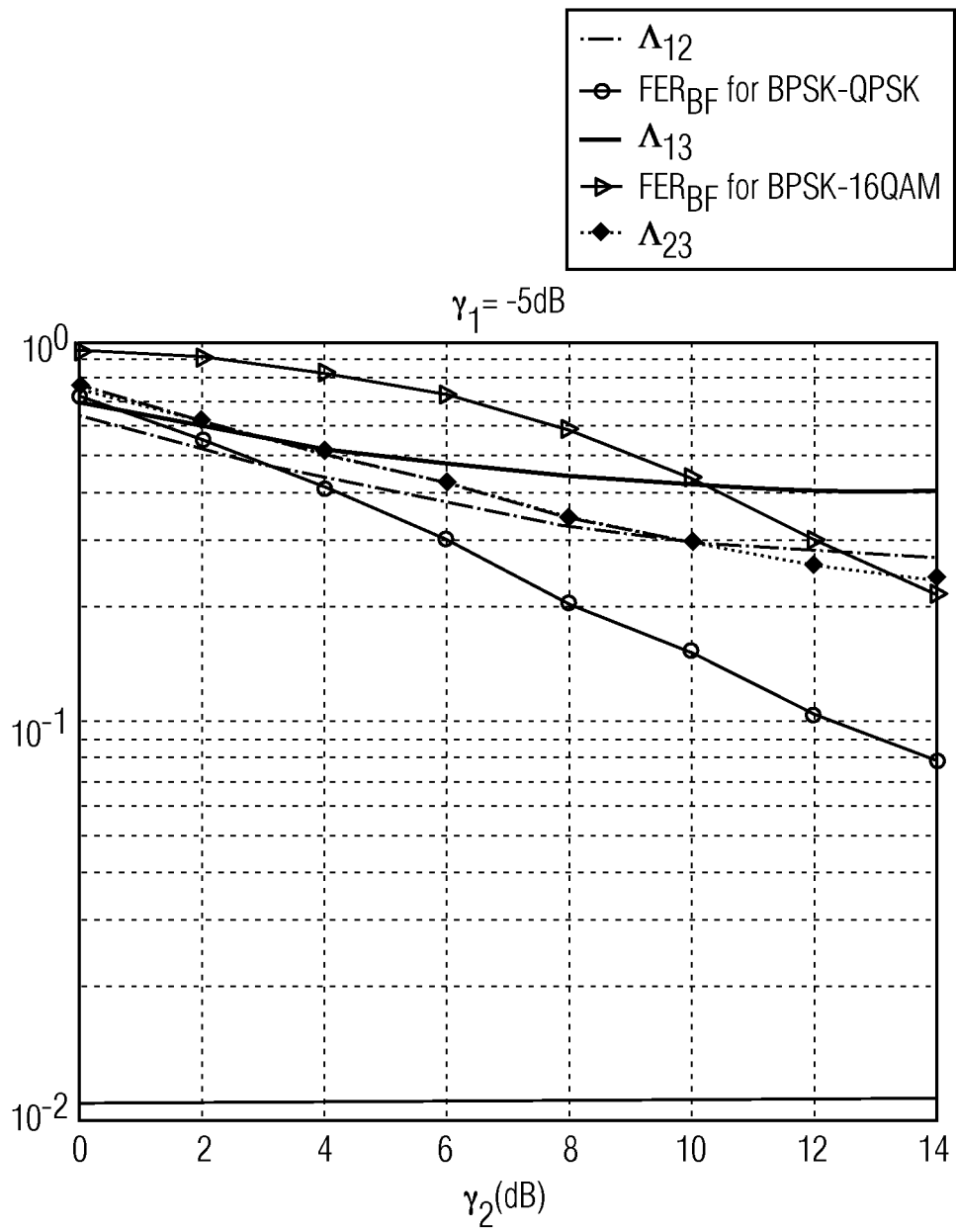
FIG. 12 illustrates $\gamma_1 = -5$ dB, threshold comparison and $P_{f,1}^{BF}$ when $S_1$ uses BPSK and $S_2$ uses QBSK and 16QAM.

For the selection of modulation mode by the partner we may either base on the direct calculation of throughput gain or use the criteria of Results 1-4. For example, $\gamma_1$=−5 dB, when $\gamma_2$<3 dB, $S_2$ choosing BPSK, gives $S_1$ the largest throughput gain as shown in FIG. 7. FIG. 12 shows the values of $P_{f,1}^{BF}$ for the cases that $S_1$ uses BPSK and $S_1$ uses QPSK and 16-QAM, respectively, and the threshold values of $\Lambda_{12}$, $\Lambda_{13}$, and $\Lambda_{23}$. For $\gamma_2$<3 dB, $P_{f,1}^{BF,2}$ is larger than $\Lambda_{12}$ and $P^{BF,3}$ is larger than $\Lambda_{23}$. Based on Result 1 BPSK used by $S_2$ brings the largest benefits to $S_1$ in terms of throughput. For 3 dB<$\gamma_2$<10.5 dB, $P_{f,1}^{BF,2}<\Lambda_{12}$ and $P^{BF,3}>\Lambda_{13}$, using Result 2 we obtain that $S_1$ chooses $S_2$ with QPSK to get the largest throughput gain. For 10.5 dB<<13.5 dB, $P_{f,1}^{BF,2}<\Lambda_{12}$, $P^{BF,3}<\Lambda_{13}$ and $P^{BF,3}>\Lambda_{23}$. Therefore, using Result 4 we find that $S_2$ should select QPSK to maximize the throughput gain for $S_1$. When $\gamma_2$>13.5 dB, $\Lambda_{13}>P_{f,1}^{BF,3}, \Lambda_{12}>P_{f,1}^{BF,2}$, and $\Lambda_{23}>P_{f,1}^{BF,3}$, using Result 4, $S_2$ selects 16-QAM to maximize the throughput for $S_1$. All these thresholds of $\gamma_2$ match the results shown in FIG. 7.

Figure 13:
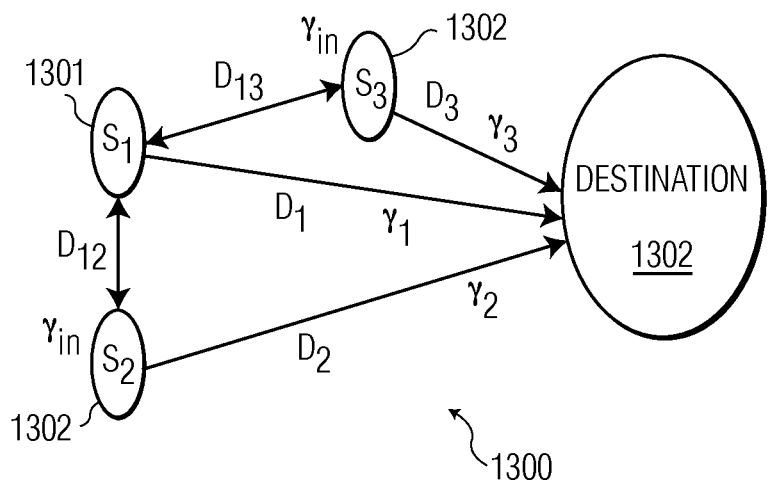
FIG. 13 illustrates an example of choice of partner in a network where two choices are possible.

The following sections address the choice of partner by a source, i.e., how to choose a best partner among a list of candidates such that the data throughput of the source can be improved most by cooperating with the partner. Also presented in the following sections is an illustration of how the source's channel quality affects the partner choice. Without loss of generality, consider a scenario where the possible partners are classified into two groups, one group has very good channel quality to the destination, but low inter-user SNR, the other group has a very good inter-user channel quality, but the channel to the destination does not have good quality. Such a scenario is depicted in FIG. 13.

Assume that partners already use the best modulation such that the throughput gain is the largest when the individual partner and the source cooperate. Here $S_2$ represents the partner with good quality inter-user channel (e.g. $S_2$ could be close to S1) and similar channel quality to the destination as the source, $S_1$, and $S_3$ represent the partner with good channel to the destination (e.g. $S_3$ is close to the destination). Note that cooperation with $S_2$ results in two level diversity and cooperation with $S_3$ always helps the source improve the throughput significantly, as illustrated in the foregoing numerical examples. Therefore, it is of interest to find which effect dominates and whether the source's channel quality affects its partner's selection of modulation rate. The following numerical example illustrates the partner choice problem.

Figure 14:
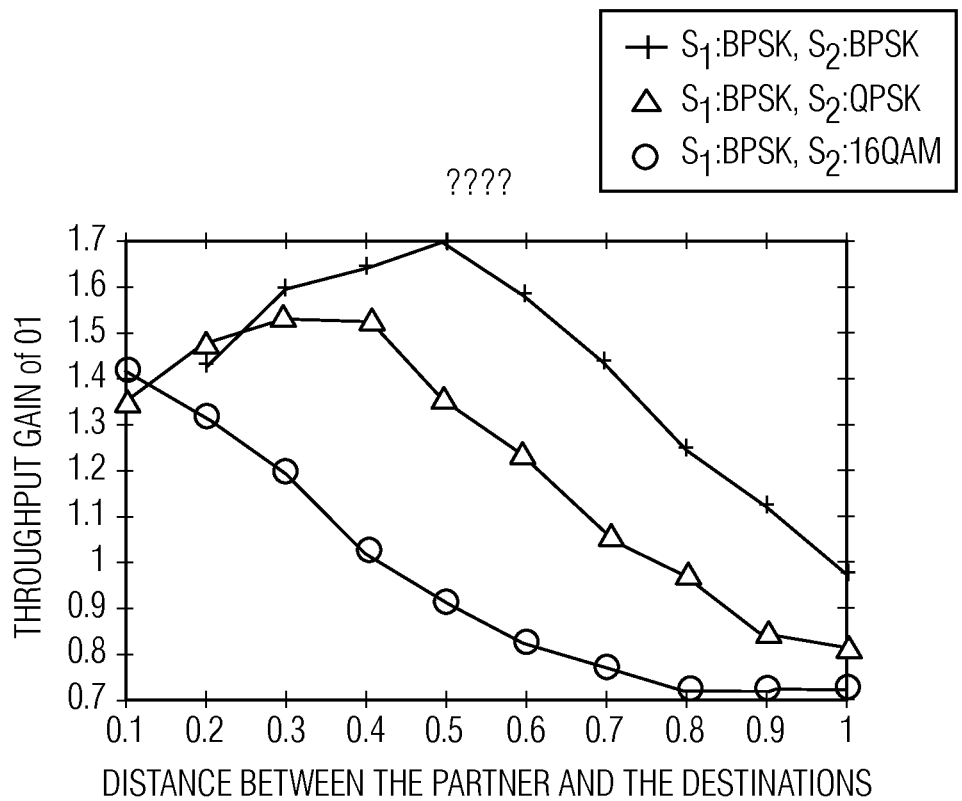
FIG. 14 illustrates throughput gain comparison for $\gamma_1 = -5$ dB, $D_1 = 1$ and the angle between $D_1$ and $D_2$ is $\pi/6$ when the partner uses BPSK, QPKS AND 16QAM respectively.
Figure 15:
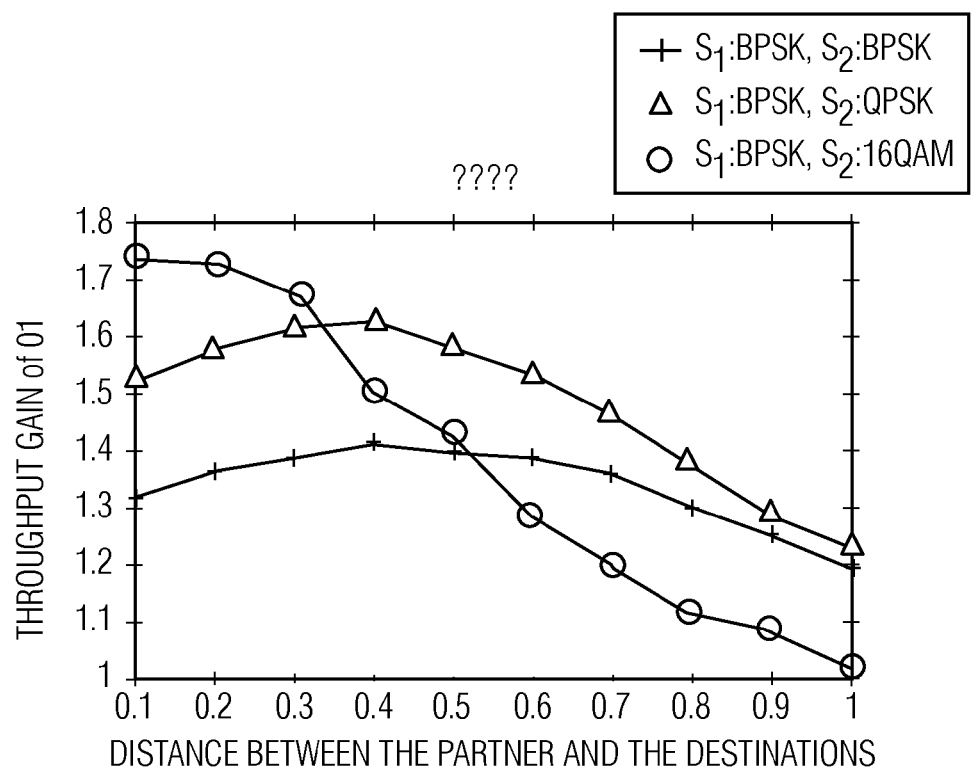
FIG. 15 illustrates throughput gain comparison for $\gamma_1 = 0$ dB, $D_1 = 1$ and the angle between $D_1$ and $D_2$ is $\pi/6$ when the partner uses BPSK, QPKS AND 16QAM respectively.

Path loss effect is incorporated with flat Rayleigh fading in the following example. As illustrated in FIGS. 14 and 15, where is D1 fixed at 1.0 and the angle between $S_1$ and $S_2$ as $$\frac{\pi}{6} \text{ and } \frac{\varepsilon}{N_0}$$

is assumed to be 0 dB and $i$ 5 dB, respectively we obtain the throughput gains for the different distances between the partner and the destination. When the distance between the partner and the destination is smaller, which means the partner is close to the destination but further away from the source, the inter-user channel between the two partnering users is worse and hence, $P_f^{in}$ is higher. Assume that D2=0.7 and D3=0.1. As shown FIGS. 14 and 15, for $$\frac{\varepsilon}{N_0} = 0 \, dB,$$

16QAM is the best modulation rate for use by $S_3$ to achieve the maximum throughput gain for $S_1$ when $S_1$ cooperates with $S_3$. QPSK is the best modulation rate used by $S_2$ such that the throughput gain for $S_1$ due to cooperation between $S_1$ and $S_2$ is maximized. In this situation, $S_1$ chooses $S_3$ rather than $S_2$ to achieve greater cooperation gain as the better user can help $S_1$ more when $S_1$ is not experiencing poor channel quality to the source. However, for $$\frac{\varepsilon}{N_0} = -5 \, dB,$$

which implies that the source has very bad link quality to the destination, the source prefers $S_2$ because $S_2$ uses a lower modulation rate than $S_3$ during cooperation. When the source is already in experiencing poor channel quality to the destination, the source chooses the partner that can help the source achieve a lower FER value rather than the partner that has a higher data rate. From these two examples it follows that when there is a list of candidates that use different modulation modes to maximize the throughput gain for the source, the source's channel quality affecting its best partner selection such that its throughput gain can be improved most.

The system and method of the present invention provide adaptive modulation for at cooperating users in coded cooperative systems to optimize the throughput for a source. The throughput gain due to cooperation has been defined in terms of the conditions under which cooperation improves the data throughput of the source. Channel qualities have been demonstrated to affect the throughput gain due to cooperation. For the case of fixed source modulation mode and variable partner modulation mode, a method has been provided for selecting a partner's modulation rate based on two operating users' channel qualities conditions 1-4. Cooperation improves the data throughput for the source and when the adaptive modulation of the present invention is used by the cooperating users, throughput can be further increased.

The present invention also provides a way for a source to select a partner among a plurality of available partners, by having the selected partner relaying information for the source such that the throughput gain of the source due to cooperation with the selected partner is the highest achievable of that which could be achieved by partnering with each of the available partners.

In the following examples, the path loss effect in each link is considered and numerical results of throughput performance are presented for direct transmission, multi-hop and coded cooperation. The examples illustrate how the users channel quality affects the data throughput gain due to cooperation and multi-hop and how much throughput gain can be obtained. We denote $D_1$ and $D_2$ as the distances between $S_1$ and the destination, $S_2$ and the destination respectively, and let $D_{in}$ be the distance between $S_1$ and $S_2$.

The path loss component, $\alpha$ is 4. Assume that the normalized distance $D_1$=1.0, $D_2$=0.6 and $D_{in}$=0.57. Hence, for the direct transmission and cooperative transmission, the received SNR at the destination from $S_1$ is $$\gamma_1 = \frac{\varepsilon}{N_0} + 10 \log_{10}(D_1^{-\alpha}) = \frac{\varepsilon}{N_0}$$

and the received SNR from $S_2$ at the destination is $$\gamma_2 = \frac{\varepsilon}{N_0} + 10 \log_{10}(D_2^{-\alpha}) = \frac{\varepsilon}{N_0} + 8.87 \, (dB).$$

However, for the multi-hop, the transmitter uses only half transmitted energy, the received SNR at $S_2$ from $S_1$ is $$\gamma_{m,in} = \frac{\varepsilon}{N_0} + 10 \log_{10}(0.5) + 10 \log_{10}(D_{in}^{-\alpha}) = \frac{\varepsilon}{N_0} + 6.87 \, (dB)$$

and the received SNR at the destination from $S_2$ is $$\gamma_{m,i2} = \frac{\varepsilon}{N_0} + 10 \log_{10}(0.5) + 10 \log_{10}(D_2^{-\alpha}) = \frac{\varepsilon}{N_0} + 5.86 \, (dB).$$

Figure 16:
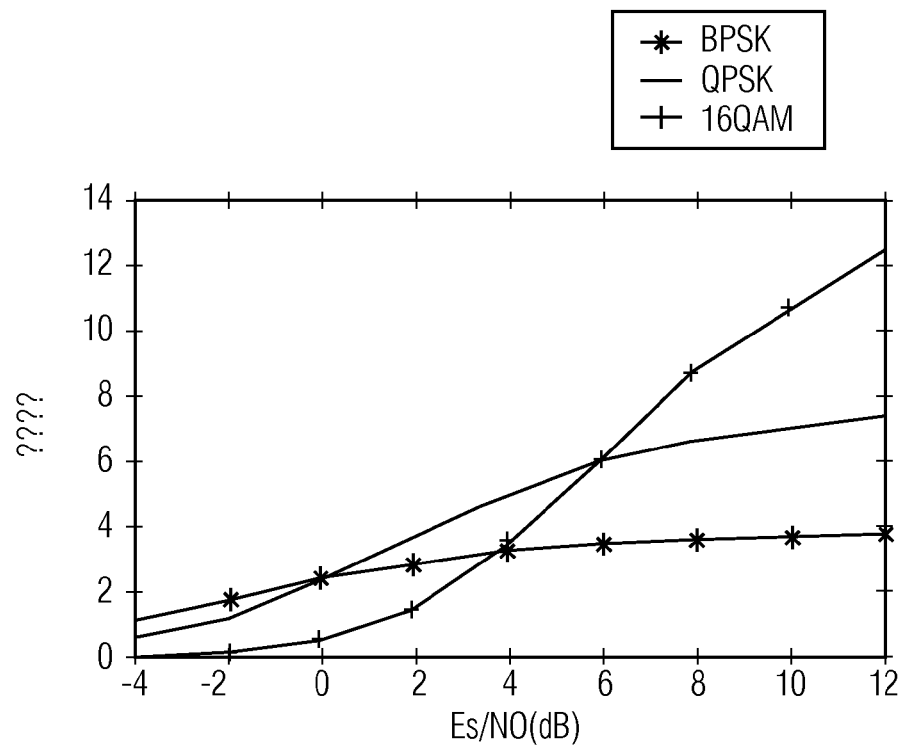
FIG. 16 illustrates throughput of direct transmission.

FIG. 16 illustrates how the throughput of direct transmission changes as a function of SNR and modulation mode. As illustrated in FIG. 16, among BPSK, QPSK and 16QAM, when the received SNR is below 0 dB, direct transmission with BPSK modulation has the highest throughput. When the received SNR is 0 dB-6 dB, QPSK is the preferred modulation preferred. Finally, when the received SNR is higher than 6 dB, 16QAM modulation is the best choice.

Figure 17:
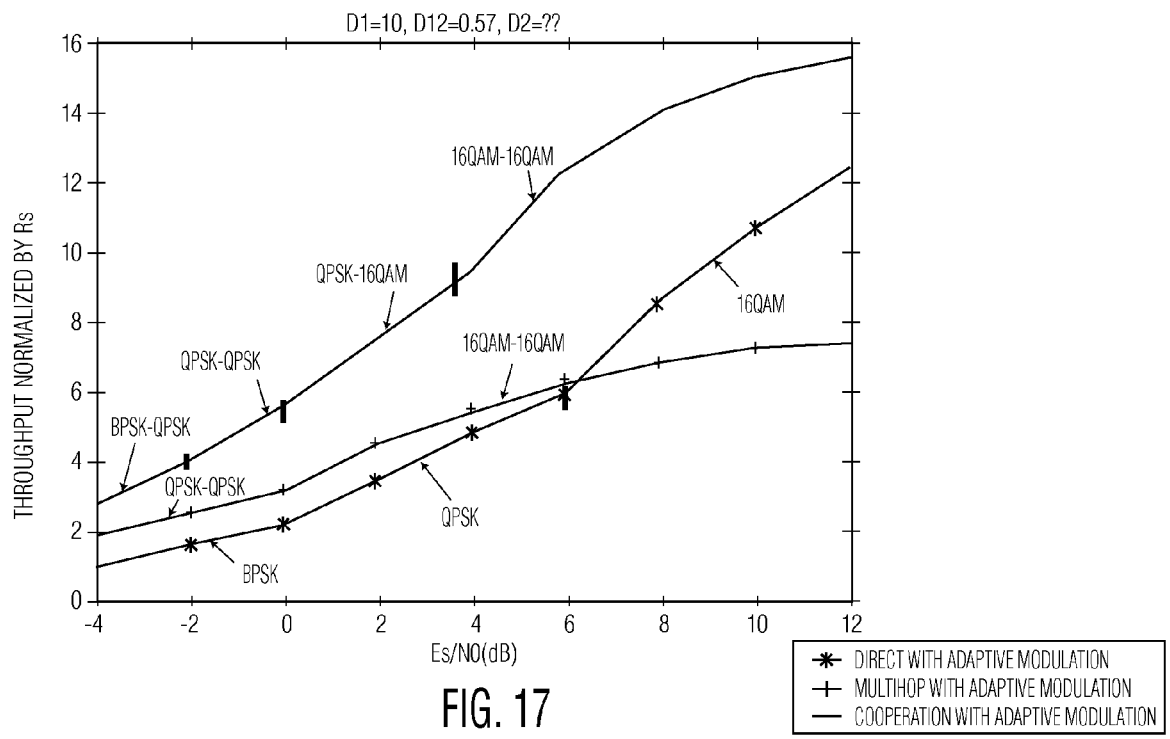
FIG. 17 illustrates throughput of direct transmission, multi-hop and coded cooperation with adaptive modulation for $D_1 = 1.0$, $D_2 = 0.6$ and $D_{in} = 0.57$.

FIG. 17 illustrates the normalized throughput (with respect to $R_s$) of direct transmission, multihop and cooperative scheme. FIG. 4 shows that coded cooperation with adaptive modulation leads to much higher throughput than either multi-hop transmission with adaptive modulation or direct transmission with adaptive modulation. The comparison of the throughput value of cooperation with that of direct transmission for this example leads to the result that cooperation provides at least a 20% gain of cooperation over direct transmission. When SNR is below 4 dB, the gain is as much as 100%. The sources of gain include diversity at the receiver, cooperative channel coding and multi-hop.

The gain solely due to multi-hop is also illustrated in FIG. 17. While multi-hop transmission with adaptive modulation is inferior to cooperation it provides superior throughput over direct transmission with adaptive modulation for low to medium SNR. But, when SNR is sufficiently high (about 6 dB in this example), the throughput of direct transmission is higher than that of multi-hop transmission. There are two main reasons for this behavior. First, the highest modulation mode is 16 QAM, and, therefore, even when the received SNR in every hop is high enough, no higher order modulation can be used. Second, when SNR increases, the FER of direct transmission also decreases, resulting in a smaller difference in FER between direct transmission and each multihop transmission. In other words, the path loss does not have a significant effect in FER performance when SNR is high enough. As a result, multi-hop transmission does not have any advantage over direct transmission in terms of throughput for high SNR.

From FIG. 4, it follows that the optimum modulation rate per hop is determined by the channel qualities of each hop, i.e., $S_1$-to-$S_2$ and $S_2$-to-destination separately. When $\gamma_{m,12}$ is from −4+6.86=2.86 dB to −2+6.86=4.86 dB and $\gamma_{m,2}$ is from −4+5.86=1.86 dB to −2+5.86=3.86 dB, $S_1$ and $S_2$ both select QPSK to maximize throughput. As SNR increases, i.e., for $$\frac{\varepsilon}{N_0} > 0 \text{ dB},$$

16 QAM becomes the best modulation choice. Unlike multi-hop, in coded cooperation, the throughput is maximized when $S_1$ and $S_2$ jointly adapt their modulation modes. For example, when $\gamma_1$=−2 dB and $\gamma_2$=6.87 dB, if $S_1$ and $S_2$ just base their modulation choices on their respective channel qualities to the destination, they would choose BPSK and 16 QAM. However, as illustrated in FIG. 4, both choosing QPSK provides the highest throughput. When $\gamma_1$=4 dB and $\gamma_2$=12.87 dB, $S_1$ and $S_2$ respectively choosing 16QAM and BPSK provides the highest throughput.

Figure 18:
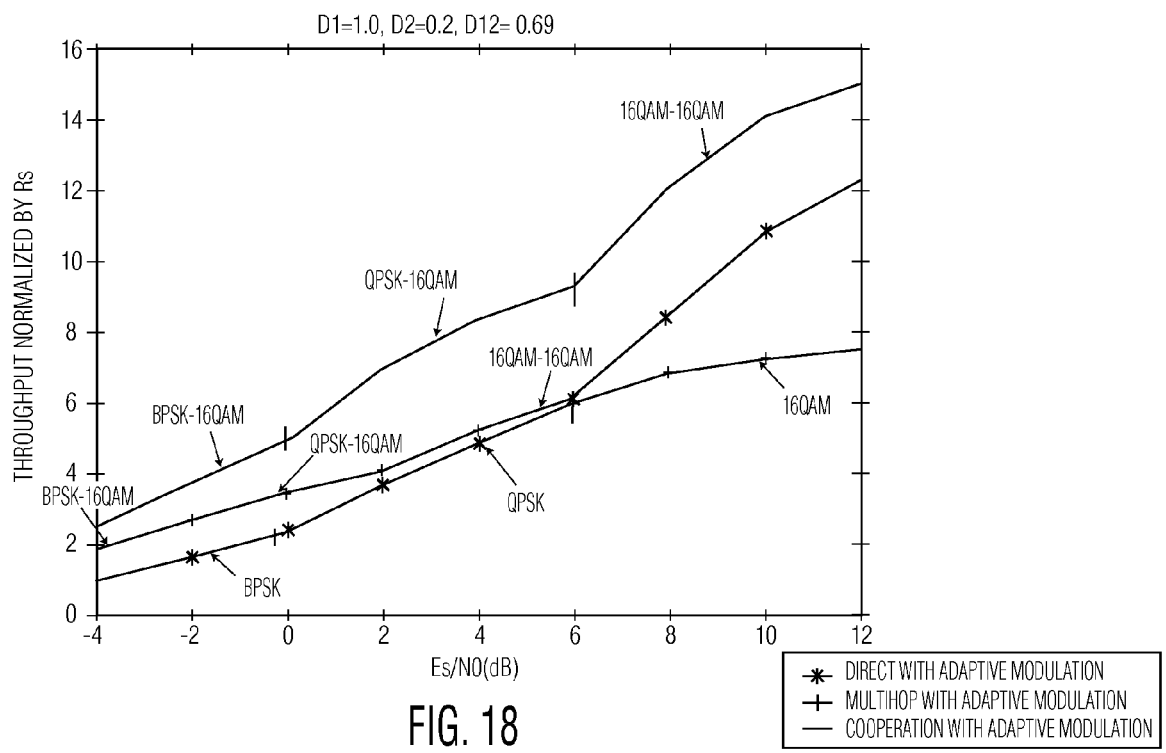
FIG. 18 illustrates throughput of direct transmission, multi-hop and coded cooperation with adaptive modulation for $D_1 = 1.0$, $D_2 = 0.2$ and $D_{in} = 0.69$.

Results for $D_1$=1.0, $D_2$=0.2 and $D_{in}$=0.69 are illustrated in FIG. 18, where the throughput gains due to cooperation are comparable to those of FIG. 17, even though the inter-user channel between $S_1$ and $S_2$ is worse. Note, however, that since the relay is close to the destination it always uses the highest order modulation, 16QAM, in both cooperative and multi-hop modes.

Figure 19:
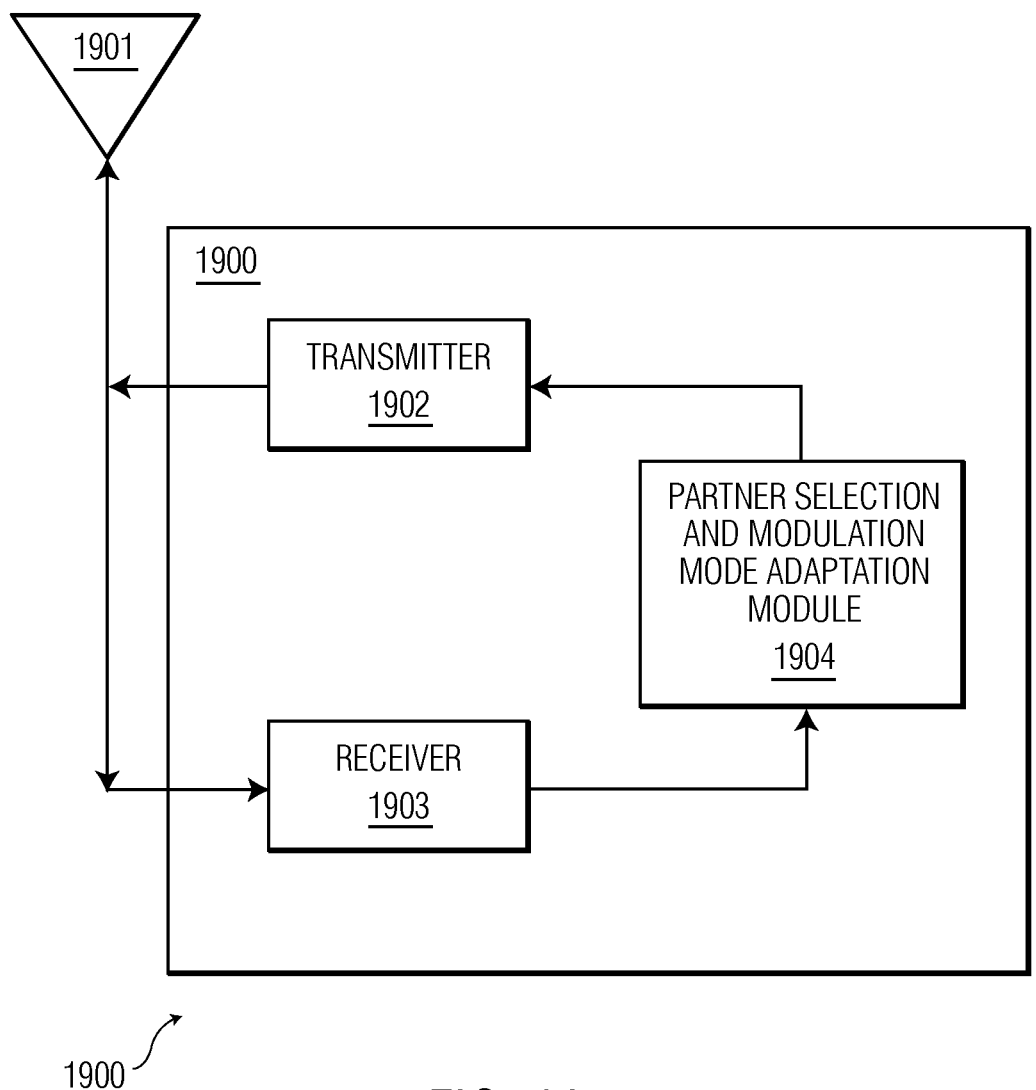
FIG. 19 illustrates an apparatus for selecting a partner and source/partner modulation modes according to the present invention.

FIG. 19 illustrates an apparatus 1900 for selecting a partner and adapting modes of the source and the partner comprising an antenna 1901 connected to a transmitter 1902 and a receiver 1903 for a source to send and receive messages, respectively, to and from candidate partners/relays. The messages received by the receiver 1903 are processed by a partner selection and modulation mode adaptation module 1904 which determines the quality of the channels and the improvements in throughput gain possible by partnering with candidate partners. The modulation mode adaptation module determines the modulation modes for the source and candidate partners required to realize the improvements in throughput gain, as well. The module 1904 selects the candidate partner/relay and source and candidate modulation modes that provide the best improvement based on the calculations of equations (10) through (14) and their associated decision criteria discussed above, which are then transmitted to the candidate by the transmitter 1902. However, in the event that closed form equations cannot readily be derived, then simulation provides the conditions and modes for selecting a candidate.

While the preferred embodiments of the present invention have been illustrated and described, it will be understood by those skilled in the art, the system and method for adaptive modulation architecture in a coded cooperative wireless communication systems as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. At least one candidate partner/relay of a source in a wireless coded cooperative communication system, having an adaptable modulation mode and being adapted to perform a pre-determined coded cooperative communication protocol to forward signals received from the source to a destination, wherein, based on the channel conditions of a pair consisting of the source and the at least one candidate, the source chooses the candidate and a corresponding pair of modulation mode settings consisting of a setting for each of the candidate modulation mode for transmission between the at least one candidate partner/relay and the destination and the source modulation mode that provide a throughput gain for transmission between the source and the candidate partner/relay, wherein the throughput gain that is improved more than the throughput gain of any other choice for the candidate and the corresponding pair of modulation mode settings.

2. The at least one candidate partner/relay of a source of claim 1, wherein the throughput gain that is improved more than any other is determined by: when the source is experiencing poor channel quality to the destination, the source selects the candidate and the corresponding pair such that a frame error rate (FER) of the source is lowered; and otherwise, the source selects the candidate and the corresponding pair with a greatest throughput gain of a set of throughput gains consisting of all throughput gains resulting from the source cooperating with each said at least one candidate partner/relay to forward said signals from the source to the destination.

3. The at least one candidate partner/relay of a source of claim 2, wherein selecting the candidate and the corresponding pair with a greatest throughput gain is achieved by performing the steps of:

computing a set consisting of 3-tuples each including a candidate partner/relay, corresponding pair of modulation modes, and throughput gain resulting from the source cooperating with the candidate to forward signals from the source to the destination using the corresponding pair of modulation modes, and selecting from the computed set the 3-tuple having a greatest throughput gain.

4. The at least one candidate partner/relay of a source of claim 2, wherein each throughput gain of the set is calculated based on a corresponding modulation mode pair selected from the group consisting of:

a. the at least one partner/relay adapts its modulation mode but the source keeps its own modulation mode constant;

b. the source adapts its modulation mode and the at least one partner/relay fixes its modulation mode; and c. the source adapts its modulation mode at the same time as the at least one partner/relay adapts its modulation mode.

5. The at least one candidate partner/relay of a source of claim 4, wherein each mode of said corresponding pair is selected from the group of modes consisting of binary phase shift keying (BPSK), quadrature phase shift keying (QPSK), and 16-state quadrature amplitude modulation (16-QAM).

6. The at least one candidate partner/relay of a source of claim 5, wherein for case 'a' if the modulation mode of the source is fixed and is BPSK and the throughput gain is $G_\Gamma''$ for n=1,2,3, n representing the modulation mode of the partner and Γ indicating that the gain G relates to a throughput Γ, the best modulation rate for a partner/relay is determined by the calculations:

$\Lambda_{12}, \Lambda_{13}, \Lambda_{23}$ being threshold values of a frame error rate, defined as $$\Lambda_{12} = \frac{1}{4} + \frac{3}{4} P_{f,1}^{BF,1},$$

$$\Lambda_{13} = \frac{3}{8} + \frac{5}{8} P_{f,1}^{BF,1},$$

$$\Lambda_{23} = \frac{1}{6} + \frac{5}{6} P_{f,1}^{BF,2}$$

and for any given $\gamma_1$ and $\gamma_2$, we have $$\Lambda_{12} < \Lambda_{13}$$

$$P_{f,1}^{BF,1} < P_{f,2}^{BF,2} < P_{f,1}^{BF,3}$$

when the source uses BPSK modulation mode:
1) If $P_{f,1}^{BF,3} > \Lambda_{13}$ and $P_{f,1}^{BF,2} > \Lambda_{12}$, $G_T^1$ is the largest, that is, throughput is maximized if the partner uses BPSK modulation mode,
2) If $P_{f,1}^{BF,3} > \Lambda_{13}$ and $P_{f,1}^{BF,2} < \Lambda_{12}$, $G_T^2$ is the largest, that is, throughput is maximized if the partner uses QPSK modulation mode,
3) If $P_{f,1}^{BF,3} < \Lambda_{13}$ and $P_{f,1}^{BF,2} > \Lambda_{12}$, $G_T^3$ is the largest, that is, throughput is maximized if the partner uses 16-QAM modulation mode,
4) $P_{f,1}^{BF,3} < \Lambda_{13}$ and $P_{f,1}^{BF,2} < \Lambda_{12}$, $G_T^2$ is the largest, that is, throughput is maximized if the partner uses QPSK modulation mode; otherwise $G_T^3$ is the largest, that is, throughput is maximized if the partner uses 16-QAM modulation mode, where $P_{f,1}^{BF,n}$ is the frame error rate for cooperative block fading channel, $\gamma_1$, $\gamma_2$ is the link signal-to-noise ratio between the source and the destination and the partner/relay and the destination, respectively.

7. The at least one candidate partner/relay of a source of claim 5, wherein, for case a if the modulation mode of the source is fixed and is QPSK and the throughput gain is $G_\Gamma^n$ for n=1,2,3, n representing the modulation mode of the partner and Γ indicating that the gain G relates to a throughput Γ, the best modulation rate for a partner/relay is determined by the calculations:

$\Lambda_{12}, \Lambda_{13}, \Lambda_{23}$ being threshold values of a frame error rate, defined as $$\Lambda_{12} = \frac{1}{3} + \frac{2}{3} P_{f,1}^{BF,1},$$

$$\Lambda_{13} = \frac{1}{2} + \frac{1}{2} P_{f,1}^{BF,1}$$

and $$\Lambda_{23} = \frac{1}{4} + \frac{3}{4} P_{f,1}^{BF,2}$$

for any given $\gamma_1$ and $\gamma_2$, we have $$\Lambda_{12} < \Lambda_{13}$$

and $$P_{f,1}^{BF,1} < P_{f,2}^{BF,2} < P_{f,1}^{BF,3}$$

we obtain the following results under the assumption that the original user uses QPSK modulation:
1) If $P_{f,1}^{BF,3} > \Lambda_{13}$ and $P_{f,1}^{BF,2} > \Lambda_{12}$, $G_\Gamma^1$ is the largest, that is, throughput is maximized if the partner uses BPSK modulation mode,
2) If $P_{f,1}^{BF,3} > \Lambda_{13}$ and $P_{f,1}^{BF,2} < \Lambda_{12}$, $G_\Gamma^2$ is the largest, that is, throughput is maximized if the partner uses QPSK modulation mode,
3) If $P_{f,1}^{BF,3} < \Lambda_{13}$ and $P_{f,1}^{BF,2} > \Lambda_{12}$, $G_\Gamma^3$ is the largest, that is, throughput is maximized if the partner uses 16-QAM modulation mode,
4) when $P_{f,1}^{BF,3} < \Lambda_{13}$ and $P_{f,1}^{BF,2} < \Lambda_{12}$, if $P_{f,1}^{BF,3} > \Lambda_{23}$, $G_\Gamma^2$ the largest, that is, throughput is maximized if the partner uses QPSK modulation mode; otherwise $G_\Gamma^3$ is the largest, that is 16-Qam modulation mode selected by the partner brings the largest throughput to the source, where $P_{f,1}^{BF,n}$ is the frame error rate for cooperative block fading channel, $\gamma_1$, $\gamma_2$ is the link signal-to-noise ratio between the source and the destination and the partner/relay and the destination, respectively.

8. The at least one candidate partner/relay of a source of claim 5,
wherein, for case 'a' if the modulation mode of the source is fixed and is 16-QAM and the throughput gain is $G_\Gamma^n$ for n=1,2,3, n representing the modulation mode of the partner and Γ indicating that the gain G relates to a throughput Γ, the best modulation rate for a partner/relay is to determined by the calculations:

$$\Lambda_{12} = \frac{2}{5} + \frac{3}{5} P_{f,1}^{BF,1},$$

$$\Lambda_{13} = \frac{3}{5} + \frac{2}{5} P_{f,1}^{BF,1}$$

and $$\Lambda_{23} = \frac{1}{3} + \frac{2}{3} P_{f,1}^{BF,2}$$

for any given $\gamma_1$ and $\gamma_2$, we have $$\Lambda_{12} < \Lambda_{13}$$

and $$P_{f,1}^{BF,1} < P_{f,2}^{BF,2} < P_{f,1}^{BF,3}$$

when the source uses 16-QAM:
1) If $P_{f,1}^{BF,3} > \Lambda_{13}$ and $P_{f,1}^{BF,2} > \Lambda_{12}$, $G_\Gamma^1$ is the largest, that is, throughput is maximized if the partner uses BPSK modulation mode,
2) If $P_{f,1}^{BF,3} > \Lambda_{13}$ and $P_{f,1}^{BF,2} < \Lambda_{12}$, $G_\Gamma^2$ is the largest, that is, throughput is maximized if the partner uses QPSK modulation mode,
3) If $P_{f,1}^{BF,3} < \Lambda_{13}$ and $P_{f,1}^{BF,2} > \Lambda_{12}$, $G_\Gamma^3$ is the largest, that is, throughput is maximized if the partner uses 16-QAM modulation mode,
4) when $P_{f,1}^{BF,3} < \Lambda_{13}$ and $P_{f,1}^{BF,2} < \Lambda_{12}$, if $P_{f,1}^{BF,3} > \Lambda_{23}$, $G_\Gamma^2$ the largest, that is, throughput is maximized if the partner uses QPSK modulation mode; otherwise $G_\Gamma^3$ is the largest, that is 16-QAM modulation mode selected by the partner brings the largest throughput to the source,
where $P_{f,1}^{BF,n}$ is the frame error rate (FER) for cooperative block fading $P_{f,1}^{BF,n}$ representing the modulation mode of the partner, BF meaning Block Fading, f representing the coded cooperative schema and 1 identifying the source S1, $\gamma_1$, $\gamma_2$ $\gamma_1$, $\gamma_2$ is the link signal-to-noise ratio (SNR) between the source and the destination and the partner/relay and the destination, respectively.

9. The at least one candidate partner/relay of a source of claim 5, wherein for cases 'b' and 'c' the modulation mode pair is selected from a pre-determined set of pairs, based on different received signal-to-noise ratios (SNRs) ($\gamma_1$ and $\gamma_2$) for the source and destination, respectively.

10. The at least one candidate partner/relay of a source of claim 9, wherein said pre-determined set of pairs is obtained by simulation of modulation mode pairs for different received SNRs ($\gamma_1$ and $\gamma_2$).

11. The at least one candidate partner/relay of a source of claim 1, wherein said signals comprise at least part of a message sent by the source to the destination.

12. A source in a wireless coded cooperative communication system, having an adaptable source modulation mode, the source adapted to select a at least one candidate partner/relay and a corresponding pair of modulation mode settings consisting of a setting for each of the candidate modulation mode and the source modulation mode that provide a throughput gain that is improved more than the throughput gain of any other choice for the at least one candidate and the corresponding pair of modulation mode settings.

13. The source of claim 12, wherein the throughput gain that is improved more than any other is determined by: when the source is experiencing poor channel quality to the destination, the source selects the at least one candidate and the corresponding pair such that a frame error rate (FER) of the source is lowered; and otherwise, the source selects the at least one candidate and the corresponding pair with a greatest throughput gain of a set of throughput gains consisting of all throughput gains resulting from the source cooperating with each of said at least one candidate partner/relay to forward signals from the source to the destination.

14. The source of claim 13, wherein said signals comprise at least part of a message sent by the source to the destination.

15. The source of claim 12, wherein selecting the at least one candidate and the corresponding pair with a greatest throughput gain is achieved by performing the steps of:

computing a set consisting of 3-tuples each including a candidate partner/relay, corresponding pair of modulation modes, and throughput gain resulting from the source cooperating with the at least one candidate to forward signals from the source to the destination using the corresponding pair of modulation modes, and selecting from the computed set the 3-tuple having a greatest throughput gain.

16. The source of claim 15, wherein each throughput gain of the set is calculated based on a corresponding modulation mode pair selected from the group consisting of:

a. the at least one partner/relay adapts its modulation mode but the source keeps its own modulation mode constant;

b. the source adapts its modulation mode and the at least one partner/relay fixes its modulation mode; and c. the source adapts its modulation mode at the same time as the at least one partner/relay adapts its modulation mode.

17. The source of claim 16, wherein, for case 'a' if the modulation mode of the source is fixed and is QPSK and the throughput gain is $G_\Gamma^n$ for n=1,2,3, n representing the modulation mode of the partner and $\Gamma$ indicating that the gain G relates to a throughput $\Gamma$, the best modulation rate for a partner/relay is determined by the calculations:

$\Lambda_{12}, \Lambda_{13}, \Lambda_{23}$ being threshold values of a frame error rate, defined as $$\Lambda_{12} = \frac{1}{3} + \frac{2}{3} P_{f,1}^{BF,1},$$

$$\Lambda_{13} = \frac{1}{2} + \frac{1}{2} P_{f,1}^{BF,1}$$

and $$\Lambda_{23} = \frac{1}{4} + \frac{3}{4} P_{f,1}^{BF,2}$$

for any given $\gamma_1$ and $\gamma_2$, we have $$\Lambda_{12} < \Lambda_{13}$$

and $$P_{f,1}^{BF,1} < P_{f,2}^{BF,2} < P_{f,1}^{BF,3}$$

we obtain the following results under the assumption that the original user uses QPSK modulation:

1) If $P_{f,1}^{BF,3} > \Lambda_{13}$ and $P_{f,1}^{BF,2} > \Lambda_{12}$, $G_\Gamma^1$ is the largest, that is, throughput is maximized if the partner uses BPSK modulation mode, 2) If $P_{f,1}^{BF,3} > \Lambda_{13}$ and $P_{f,1}^{BF,2} < \Lambda_{12}$, $G_\Gamma^2$ is the largest, that is, throughput is maximized if the partner uses QPSK modulation mode, 3) If $P_{f,1}^{BF,3} < \Lambda_{13}$ and $P_{f,1}^{BF,2} > \Lambda_{12}$, $G_\Gamma^3$ is the largest, that is, throughput is maximized if the partner uses 16-QAM modulation mode, 4) when $P_{f,1}^{BF,3} < \Lambda_{13}$ and $P_{f,1}^{BF,2} < \Lambda_{12}$, if $P_{f,1}^{BF,3} > \Lambda_{23}$, $G_\Gamma^2$ the largest, that is, throughput is maximized if the partner uses QPSK modulation mode; otherwise $G_\Gamma^3$ is the largest, that is 16-Qam modulation mode selected by the partner brings the largest throughput to the source, where $P_{f,1}^{BF,n}$ is the frame error rate for cooperative block fading channel, n representing the modulation mode of the partner BF meaning Block Fading, f representing the coded cooperative schema and I identifying the source S1, $\gamma_1$, $\gamma_2$ is the link signal-to-noise ratio between the source and the destination and the partner/relay and the destination, respectively.

18. The source of claim 16, wherein, for case 'a' if the modulation mode of the source is fixed and is 16-QAM and the throughput gain is $G_\Gamma^n$ for n=1,2,3, n representing the modulation mode of the partner and $\Gamma$ indicating that the gain G relates to a throughput $\Gamma$, the best modulation rate for a partner/relay is to be determined by the calculations:

$$\Lambda_{12} = \frac{2}{5} + \frac{3}{5} P_{f,1}^{BF,1},$$

$$\Lambda_{13} = \frac{3}{5} + \frac{2}{5} P_{f,1}^{BF,1}$$

and $$\Lambda_{23} = \frac{1}{3} + \frac{2}{3} P_{f,1}^{BF,2}$$

for any given $\gamma_1$ and $\gamma_2$, we have $$\Lambda_{12} < \Lambda_{13}$$

and $$P_{f,1}^{BF,1} < P_{f,2}^{BF,2} < P_{f,1}^{BF,3}$$

when the source uses 16-QAM:

1) If $P_{f,1}^{BF,3} > \Lambda_{13}$ and $P_{f,1}^{BF,2} > \Lambda_{12}$, $G_\Gamma^1$ is the largest, that is, throughput is maximized if the partner uses BPSK modulation mode, 2) If $P_{f,1}^{BF,3} > \Lambda_{13}$ and $P_{f,1}^{BF,2} < \Lambda_{12}$, $G_\Gamma^2$ is the largest, that is, throughput is maximized if the partner uses QPSK modulation mode, 3) If $P_{f,1}^{BF,3}<\Lambda_{13}$ and $P_{f,1}^{BF,2}>\Lambda_{12}$, $G_\Gamma^3$ is the largest, that is, throughput is maximized if the partner uses 16-QAM modulation mode, 4) when $P_{f,1}^{BF,3}<\Lambda_{13}$ and $P_{f,1}^{BF,2}<\Lambda_{12}$, if $P_{f,1}^{BF,3}>\Lambda_{23}$, $G_\Gamma^2$ the largest, that is, throughput is maximized if the partner uses QPSK modulation mode; otherwise $G_\Gamma^3$ is the largest, that is 16-QAM modulation mode selected by the partner brings the largest throughput to the source, where $P_{f,1}^{BF,n}$ is the frame error rate (FER) for cooperative block fading $P_{f,1}^{BF,n}$, n representing the modulation mode of the partner, BF meaning Block Fading, f representing the coded cooperative schema and 1 identifying the source S1, $\gamma_1$, $\gamma_2$ $\gamma_1$, $\gamma_2$ is the link signal-to-noise ratio (SNR) between the source and the destination and the partner/relay and the destination, respectively.

19. The source claim 16, wherein for cases 'b' and 'c' the modulation mode pair is selected from a pre-determined set of pairs, based on different received signal-to-noise ratios (SNRs) ($\gamma_1$ and $\gamma_2$) for the source and destination, respectively.

20. The source claim 19, wherein said pre-determined set of pairs is obtained by simulation of modulation mode pairs for different received SNRs ($\gamma_1$ and $\gamma_2$).

21. The source of claim 12, wherein each mode of said corresponding pair is selected from the group of modes consisting of binary phase shift keying (BPSK), quadrature phase shift keying (QPSK), and 16-state quadrature amplitude modulation (16-QAM).

22. The source of claim 21, wherein for case 'a' if the modulation mode of the source is fixed and is BPSK and the throughput gain is $G_\Gamma^n$ for n=1,2,3, n representing the modulation mode of the partner and $\Gamma$ indicating that the gain G relates to a throughput $\Gamma$, the best modulation rate for a partner/relay is determined by the calculations:

$\Lambda_{12}, \Lambda_{13}, \Lambda_{23}$ being threshold values of a frame error rate, defined as $$\Lambda_{12} = \frac{1}{4} + \frac{3}{4} P_{f,1}^{BF,1},$$

$$\Lambda_{13} = \frac{3}{8} + \frac{5}{8} P_{f,1}^{BF,1},$$

$$\Lambda_{23} = \frac{1}{6} + \frac{5}{6} P_{f,1}^{BF,2}$$

and for any given $\gamma_1$ and $\gamma_2$, we have $\Lambda_{12}<\Lambda_{13}$ $P_{f,1}^{BF,1}<P_{f,2}^{BF,2}<P_{f,1}^{BF,3}$ when the source uses BPSK modulation mode:
1) If $P_{f,1}^{BF,3}>\Lambda_{13}$ and $P_{f,1}^{BF,2}>\Lambda_{12}$, $G_T^1$ is the largest, that is, throughput is maximized if the partner uses BPSK modulation mode,
2) If $P_{f,1}^{BF,3}>\Lambda_{13}$ and $P_{f,1}^{BF,2}<\Lambda_{12}$, $G_T^2$ is the largest, that is, throughput is maximized if the partner uses QPSK modulation mode,
3) If $P_{f,1}^{BF,3}<\Lambda_{13}$ and $P_{f,1}^{BF,2}>\Lambda_{12}$, $G_T^3$ is the largest, that is, throughput is maximized if the partner uses 16-QAM modulation mode,
4) when $P_{f,1}^{BF,3}<\Lambda_{13}$ and $P_{f,1}^{BF,2}<\Lambda_{12}$, $G_T^2$ the largest, that is, throughput is maximized if the partner uses QPSK modulation mode; otherwise $G_T^3$ is the largest, that is, throughput is maximized if the partner uses 16-QAM modulation mode, where $P_{f,1}^{BF,n}$ is the frame error rate for cooperative block fading channel, n representing the modulation mode of the partner, BF meaning Block Fading, f representing the coded cooperative schema and 1 identifying the source S1, $\gamma_1$, $\gamma_2$ is the link signal-to-noise ratio between the source and the destination and the partner/relay and the destination, respectively.

\* \* \* \* \*